United States Patent
Morioka et al.

(10) Patent No.: US 6,292,878 B1
(45) Date of Patent: Sep. 18, 2001

(54) DATA RECORDER AND METHOD OF ACCESS TO DATA RECORDER

(75) Inventors: Yoshihiro Morioka, Nara-ken; Naohisa Motomura, Hiroshima; Hiroshi Kase; Shinji Hamai, both of Osaka-fu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/017,675

(22) Filed: Feb. 3, 1998

Related U.S. Application Data

(63) Continuation-in-part of application No. 08/989,855, filed on Dec. 12, 1997, now abandoned.

(30) Foreign Application Priority Data

Dec. 12, 1996 (JP) .................................................. 8-331779
Feb. 3, 1997 (JP) .................................................. 9-020618

(51) Int. Cl.[7] .................................................. G06F 12/00
(52) U.S. Cl. .......................... 711/209; 711/114; 711/171
(58) Field of Search ................................. 711/112, 114, 711/113, 209; 710/5, 62; 707/204; 714/7

(56) References Cited

U.S. PATENT DOCUMENTS

| 5,161,143 | * | 11/1992 | Fukushima et al. | 369/53 |
| 5,257,367 | * | 10/1993 | Goodlander et al. | 707/204 |
| 5,461,719 | * | 10/1995 | Hosoya | 711/112 |
| 5,515,500 | * | 5/1996 | Mizuno et al. | 714/7 |
| 5,564,114 | | 10/1996 | Popat et al. | 701/105 |
| 5,745,783 | * | 4/1998 | Suzuki et al. | 710/5 |
| 5,802,394 | * | 9/1998 | Baird et al. | 710/5 |
| 5,953,513 | * | 9/1999 | Saiki et al. | 710/5 |
| 5,983,319 | * | 11/1999 | Ito | 711/113 |

FOREIGN PATENT DOCUMENTS

| 0 508 441 A2 | 10/1992 | (EP) . |
| 0 716 370 A2 | 6/1996 | (EP) . |
| 5-265661 | 10/1993 | (JP) . |
| 8-176934 | 6/1997 | (JP) . |
| 8-57659 | 9/1997 | (JP) . |

OTHER PUBLICATIONS

"High–Data–Rate Video Storage using Hard Disk Drives", IBM Technical Disclosure Bulletin, vol. 37, No. 12, Dec. 1994, pp. 505–507, XP000487870.

* cited by examiner

*Primary Examiner*—Matthew Kim
*Assistant Examiner*—Fred F. Tzeng
(74) *Attorney, Agent, or Firm*—McDermott, Will & Emery

(57) ABSTRACT

The present invention relates to a data recorder which chronologically records continuous data such as image data without interruption at high speed, a medium which stores the procedure of recording or reproducing in the data recorder as a program, and a method of accessing the data recorder. In one embodiment, the data recorder is equipped with a group of recording units, and each group unit has a SCSI adaptor and a hard disk. The hard disk is connected to the SCSI bus and the SCSI adaptor is connected to a PCI bus. With this construction, data to be recorded in the data recorder is split into units of a prescribed size and assigned and recorded on the group of recording units so as to utilize a plurality of hard disks as a single logical recording space.

25 Claims, 18 Drawing Sheets

FIG.9
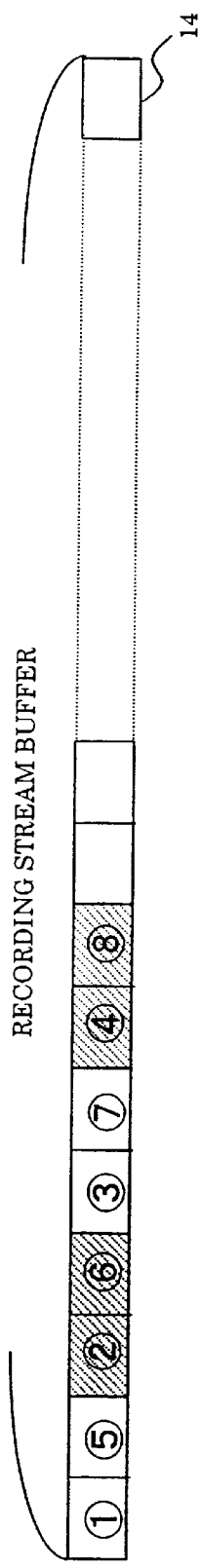
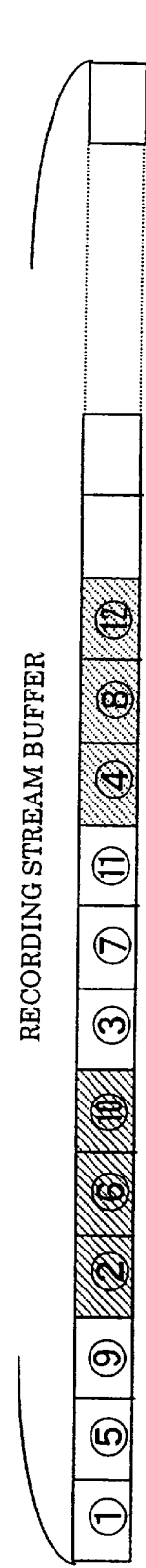
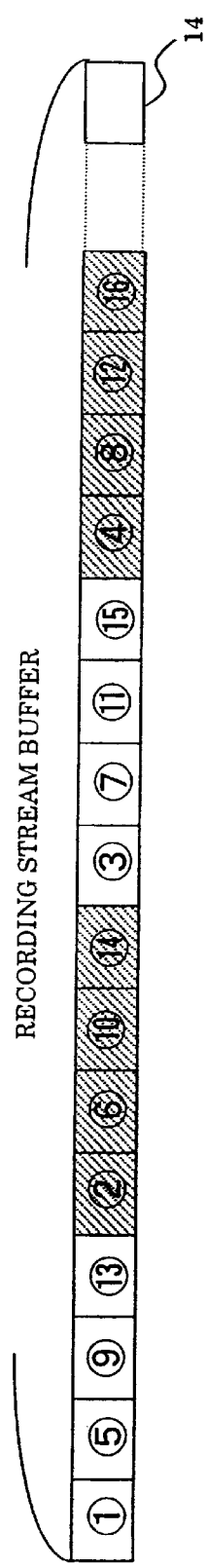

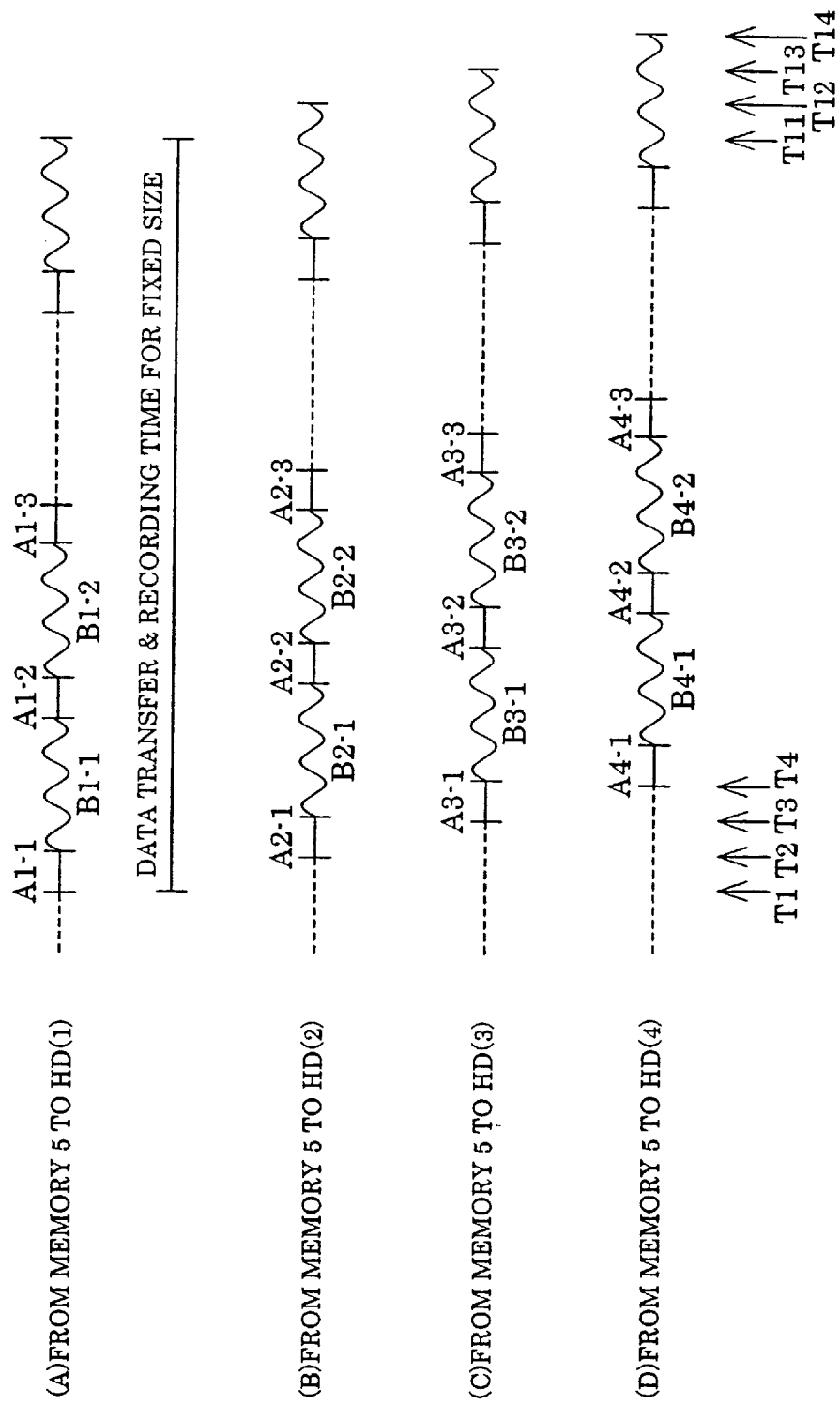

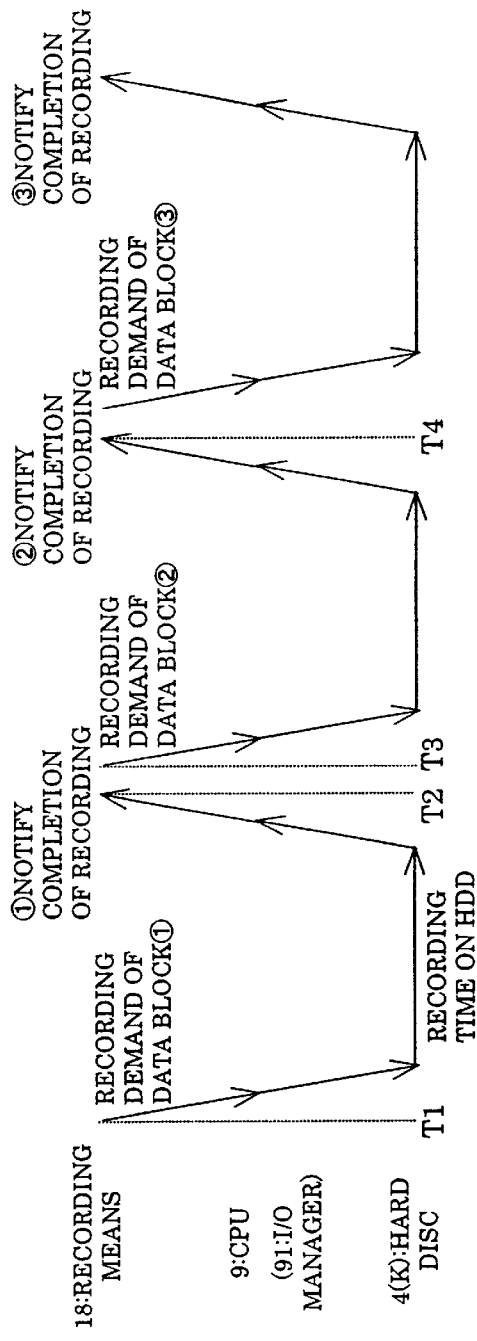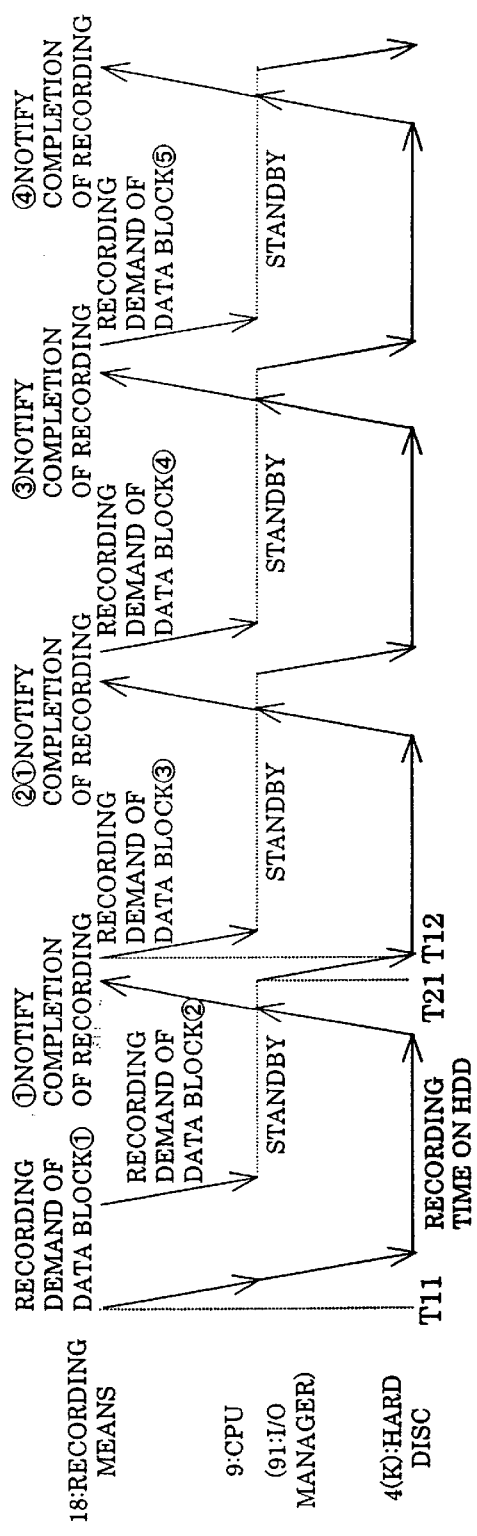

DATA RECORDER AND METHOD OF ACCESS TO DATA RECORDER

RELATED APPLICATIONS

This application is a continuation-in-part of U.S. patent application Ser. No. 08/989,855, filed Dec. 12, 1997, now abandoned, entitled "DATA TRANSMISSION METHOD AND ITS DEVICE" which is disclosed herein by reference.

FIELD OF THE INVENTION

The present invention relates to a data recorder, more specifically to a data recorder for recording chronologically continuous data such as image data, a method of access to the data recorder, and a medium for storing the procedure of recording or reproduction in the data recorder as a program.

BACKGROUND OF THE INVENTION

There is a growing need of handling a very large volume of data by computer in a short time with the progress of multimedia in recent years. For example, there are cases where it becomes necessary to make input & output of a large volume of data in a file server, etc. or cases where chronologically continuous analogue signals such as image, etc. are digitized and that data stream is recorded on a recording medium such as hard disc, etc. (hereinafter the explanation will be made by taking hard disc as example of recording medium) or reproduced from the hard disc. Especially when handling images, it is requested that the data be recorded or reproduced at high speed and seamlessly, and various kinds of proposal are made from this viewpoint.

FIG. 18 is a conceptual drawing showing an example of construction of a conventional data recorder in computer. A host adaptor 2 is connected to the host bus 1 of the computer 8. The host adaptor 2 developed in recent years is adapted to bus master DMA transfer capable of transfer at higher speed and, in case of occurrence of any command for recording and readout to the hard disc, a controller 6 inside the host adaptor 2 obtains the monopoly right of the host bus 1, and the controller 6 transfers any desired data from the memory 5 to a buffer memory 7 incorporated in the host adaptor 2 through the host bus 1. In this way, the data written in the buffer memory 7 is recorded in the hard disc 4 through the transfer bus 3. Next, when reading out the data, the controller 6 transfers the data in the hard disc 4 to the buffer memory 7 through the transfer bus 3, and then the controller 6 obtains the monopoly right of the host bus and transfers the contents of the buffer memory 7 to a desired area of the memory 5.

FIG. 19 shows another conventional example of recording and readout in hard disc. As disclosed in Japanese patent application No. 5-265661 for example, the recording data is dispersed for recording on a plural number of hard discs, to enable processing at higher speed.

The host adaptor 2 connected to the host bus 1 of the computer 8 is provided with one or a plural number of transfer buses 3, and a plural number of hard discs 4(1)~4(4) are connected to the transfer bus 3. However, the number of hard discs 4 indicated in FIG. 19 is only an example, and the number of hard discs connected to each transfer bus 3 may be decided as desired.

In case of occurrence of any command for recording data, the controller 6 incorporated in the host adaptor 2 obtains the monopoly right of the host bus 1, and the controller 6 transfers any desired data from the memory 5 to the buffer memory 7 incorporated in the host adaptor 2 through the host bus 1. Next, the data thus written in the buffer memory 7 is dispersed by the controllers 6(1), 6(2) for recording on the respective hard discs 4(1)~4(4). The role of the controllers 6(1), 6(2) may well be played by the controller 6 as a matter of course. In this case, the recording time is shortened because the recording on the respective hard discs 4(1)~4(4) is made by overlapping with one another in time.

However, the above construction, which is realized in such a way that the controller 6 inside the host adaptor 2 temporarily stores the recording data in the buffer memory 7 as cache memory in the adaptor 2 through the host bus 1 and transfers that data to the respective hard discs 4 through the transfer bus 3 of the host adaptor 2, presents a problem that the processing for transferring the data from the memory 5 on the computer to the buffer memory 7 on the host adaptor 2 and the processing for transferring from the buffer memory 7 to the hard disc 4 cannot be handled in parallel.

Moreover, it also has a problem that, when making a bus master DMA transfer on the host bus 1 of the computer, time for arbitration control is required for one device (controller 6 in this case) to secure the monopoly right of the hose bus and, because the time of monopoly by one device is limited, the high-speed transfer capacity of the host bus is not fully utilized At present, by comparison between the host bus 1 in the computer and the transfer bus of the host adaptor 2, the host bus 1 in the computer can apparently transfer data at higher speed. To give an example, since the transfer speed of SCSI bus, which is the representative host adaptor, is 40 Mbytes/sec with the Ultra Wide standard, which is the highest transfer speed, against 133 Mbytes/sec of the PCI (Peripheral Component Interconnect) bus, which is the representative host bus of computer, it is apparent that the host bus can make the transfer at higher speed.

The object of the present invention is to provide a data recorder capable of enabling data recording and readout at higher speed to record and read out high-bit-rate data stream at high speed by assigning the idle time of this host bus to data transfer as much as possible and by performing the processing for transferring the data from the memory on the computer to the buffer memory on the host adaptor and the processing for transferring from the buffer memory to the hard disc in parallel, and a method of access to the data recorder.

By the way, editing of images and sounds, etc. is made on the computer by connecting an apparatus for either recording or reproducing image and sound data (VTR, video camera, hard disc, optical disc, etc.) to a computer through a special interface or network and transmitting data to the computer. For example, the recording & reproduction systems indicated in Japanese patent applications Nos. 8-57659, 8-176934, etc. are intended for such editing.

When transferring data from said recording & reproduction system to a computer, it is necessary to convert signals of a prescribed form into signals of a form conformable to the data bus used for the system (signals of PCI form, for example). For that reason, all of said conventional examples are designed to make said conversion of data form on the computer and to also perform other necessary operations on the computer.

However, in the case where said data conversion and editing are fully performed on the computer as stated above, the size of said data transfer depends on the construction of hardware constituting the computer, as well as the operating system (OS), device driver, application software, etc. On the other hand, said component elements on the computer chronologically change and, therefore, the data size available for transfer within a specific period of time also changes.

For that reason, there is a problem that even a slight change (increase of the number of display units used, for example) in the system construction such as VGA (Video Graphics Array) extension board or hard disc, etc. makes high-speed data transfer in the internal data bus impossible and, as a result, leads to such phenomena as getting out of frame of reproduced image, etc. or deteriorated transmission efficiency allowing transmission only in a data size smaller than the normally available data size.

Moreover, there is another problem that, when performing editing while transmitting data at the same time, the transmitted data may be lost because of the load on the CPU.

Another object of the present invention is to provide a data transmission method and apparatus capable of efficiently performing data transfer from recording & reproduction system to computer or from computer to recording & reproduction system, without depending on the system construction, and to also provide a highly reliable data transmission method and apparatus.

SUMMARY OF THE INVENTION

To achieve said objects, the present invention adopts the means described hereafter. Firstly, the present invention presupposes a data recorder equipped with recording unit composed of host adaptor 2 connected to the host bus 1 and recording medium connected to the host adaptor 2.

Here, a group of recording units with a plural number of sets of said recording unit is constructed in the first place, to split the data to be recorded into units of prescribed size with an input proportioning means 17 and assign said data split into units of prescribed size to a plural number of recording media 4 constituting said group of recording units so that the respective recording media 4 may become a single logical recording space. And, it is so arranged that a command is given to the respective host adaptors 2 at a time to transfer the assigned data in prescribed size to the respective recording media 4 by using recording means 18.

This makes it possible for the controllers 6 incorporated in the host adaptors 2 to receive said data and record it in the corresponding hard discs 4.

By arranging the system in a way to hold the data to be recorded temporarily on the memory 5 of the computer 8 in correspondence to the respective recording units, it becomes possible to cope also with a case where said data is a seamless data stream which is input at high speed through an I/O adaptor 10.

In this case, it becomes possible to efficiently use the memory by arranging in such a way as to record said split data in a continuous space on said memory 5 and record the addresses of said data in another space on that memory in correspondence to the respective recording units.

The transfer speed further increases by making said transfer at the time when the number of split data corresponding to the respective discs in said continuous space on the memory became "n" ("n" is a natural number), in the stage of said input proportioning.

The data recorded on disc units as described above can be read out sequentially by using readout means 22. At that time, high-speed processing becomes possible by arranging in a way to temporarily record the readout data in the memory 5 sequentially and then output them by using output means.

The present invention is realizable only with an operating system (OS) provided with a multitask function capable of processing even with simultaneous issuance of commands to a plural number of terminal equipment units. Moreover, it can also handle a plural number of commands to a single terminal equipment unit by using the multitask function. Therefore, by issuing a plural number of recording commands in advance to the host adaptor 2 corresponding to one hard disc, it becomes possible to make more efficient data transfer.

Said method of access to the recording medium is effective if applied to a case where it is necessary to handle the data transferred at high speed to the memory 5. For example, it can be applied to a system using an image reproduction unit capable of inputting & outputting data of a size 4 times larger than the data size required for the indication of a single frame time on the display unit in said single frame time, as explained below.

First, between the recording & reproduction device and the computer is disposed an I/O adaptor 10 for converting from the data form of the recording & reproduction device to a data form suitable for the data bus used for the computer, or for converting in the opposite direction.

To be more concrete, this system will become as shown in FIG. 15 to FIG. 17, an outline of which is described hereafter.

Said I/O adaptor 10 converts data from the recording & reproduction device to a data form suitable for the data bus used for the computer, and also converts data from the data bus to a data form suitable to the recording & reproduction device. The data converted by said I/O adaptor 10 is once accumulated in the memory 5 controlled by the CPU 9 through data bus by the 1st asynchronous transfer means 81 and, at the point in time when data of a specific size is accumulated here, data of a certain size among that data of specific size is asynchronously transferred to the 2nd memory means by the 2nd asynchronous transfer means 82.

A variety of systems may be adopted for this 2nd asynchronous transfer means 82, and efficient data transfer will become possible with the adoption of said method of access to the data recorder.

By the way, as indicated in said prior art, a system is developed for transferring data of DVC form (form in which image data and audio data are mixed into a hybrid, and other necessary control data are transferred together with said hybrid signals) from VTR as recording & reproduction unit to computer (PC) at high speed through PCI (Peripheral Component Interconnect) bus, and submitting that data to processing such as editing, etc. on the computer (refer to said prior art). Here, high-speed transfer refers to a case where data of a size 4 times larger than the data size required for the indication of one frame time on the display unit in said single frame time, for example. (The data size of one frame is usually 28.8 Mbps, and therefore comes to 115.2 Mbps at a speed 4 times faster.)

In said system, even if the data accumulated in said VTR 100 and the data on the PCI bus are of one same DVC data form, conversion of the bit number is required. For that reason, in the present invention, said I/O adaptor controlling said data transfer to the computer is realized in a way to use an interface for converting the bit number of the data obtained from said recording & reproduction unit and an interface for conversion in the opposite direction.

With said construction, it becomes possible to perform high-speed data transfer from recording & reproduction unit to computer, and it also becomes possible to make high-speed data transfer from computer to recording & reproduction unit in the same way. Especially in the case where said data is an image data such as DVC, etc., data of a speed 4 times faster than the normal speed can be efficiently transferred. Moreover, the reliability improves without producing any loss of data even when other operations such as editing, etc. are performed concurrently during a data transfer.

The DVC data transferred at high speed to the memory 5 controlled by the CPU 9 as described above can also be submitted, on that CPU 9, to a processing for separation of audio data and video data, and a subcode data processing (code which can be set optionally by the user, such as skip code, for example).

Moreover, this DVC data can be transferred by DMA to a 2nd storing means 12 such as HDD, etc. during the execution of said processings. At that time, at the point in time when the data input from said recording & reproduction unit to the memory 5 is accumulated in the memory 5 by the prescribed size (data size required for the indication of prescribed number of frames on the display unit, for example), the CPU 9 issues an asynchronous DHA transfer command, and starts transferring the DVC data to said 2nd storing means 12 by prescribed data sizes (per frame, for example) through a plural number of controllers on the SCSI interface.

Said 1st asynchronous transfer and 2nd asynchronous transfer are performed in a time-sharing way by 24 clocks with a pause of 8 clocks, for example, between them. Therefore, even with a time in units of milli-second, it looks as if the data transfer were being made in a multiplex way chronologically on the PCI bus. Namely, it becomes possible to accumulate, in real time, DVC data of a speed 4 times faster than normal from VTR to a plural number of HDD. Moreover, it also becomes possible to perform other tasks such as non-linear editing or normal-speed reproduction of other stream, etc. concurrently during a high-speed transfer.

BRIEF DESCRIPTION OF THE DRAWINGS

FIG. 9 is a conceptual drawing showing another embodiment of the present invention.

FIG. 10 is a time chart of one recording cycle of the present invention.

FIG. 11 is a time chart of the present invention.

FIG. 12 is a time chart of a still another embodiment of the present invention.

EMBODIMENTS OF THE INVENTION

Explanation will be given on embodiments of the present invention hereafter based on drawings.

[Embodiment 1]

Figure 1:
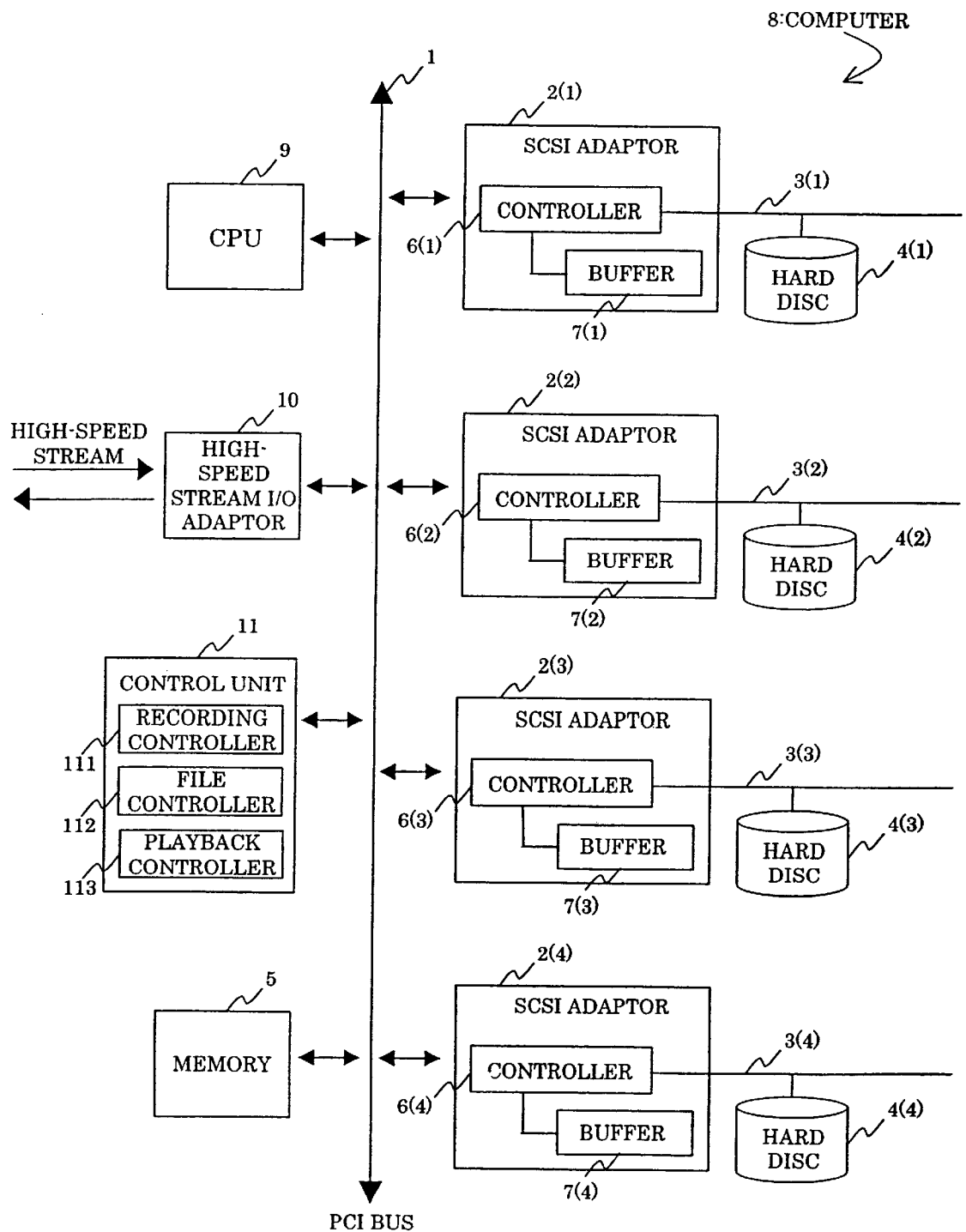
FIG. 1 is a system construction drawing showing an embodiment of the present invention.

FIG. 1 is a system construction drawing showing an embodiment of the present invention. This system is constructed by using a computer, and the computer 8 is provided with a memory 5, a PCI bus 1 as host bus, SCSI adaptors 2(k) as host adaptors connected to the PCI bus 1 (k is a natural number. 1~4 are used in this specification), hard discs 4(k) as recording media connected to the SCSI bus 3(k) of the respective SCSI adaptors 2(k). and a control unit 11 for controlling access to said respective hard discs 4(k).

Said SCSI adaptor 2(1) and hard disc 4(1)~SCSI adaptor 2(4) and hard disc 4(4) (namely, group of SCSI adaptor and hard disc with one same number in parentheses) constitute a recording unit respectively, and those 4 pairs of recording unit constitute one group of recording units. Each SCSI adaptor 2(k) enables bus master DMA transfer. Namely, the controller 6 incorporated in the SCSI adaptor 2(k) can obtain the monopoly right of the PCI bus 1 and transfer any desired data on the memory 5 to the buffer 7 incorporated in the SCSI adaptor 2(k) through the PCI bus 1.

Although PCI bus is used as host bus of the computer in this embodiment, other type of data transfer bus may also be used if only it satisfies the condition of transfer speed. Moreover, while SCSI adaptor is used as host adaptor, it is also all right to use other type of host adaptor capable of bus master DMA transfer.

The I/O adaptor 10 is capable of inputting stream data of high bit rate in units of fixed-size block based on instructions from said control unit 11, and transferring it to an optional area on the memory 5 or outputting data previously recorded in an optional area of the memory 5 as stream data.

The control unit 11 is composed of a recording controller 111, a file controller 112 and a reproduction controller 113 described below.

The recording controller 111 takes charge of recording control, under the control of the CPU 9, in such a way that the data stream, continuously input in units of fixed-size block, may be recorded in time without failure, i.e. by distributing the data stream to the respective hard discs 4 while maintaining the memory 5 in a state without overflow. The file controller 112 controls the arrangement on hard discs of the data recorded on the respective hard discs 4. The reproduction controller 113 controls the processes of reconstructing the data stream by sequentially reading out the data distributed to and recorded on the respective hard discs 4 and outputting it on the I/O adaptor 10.

Figure 2:
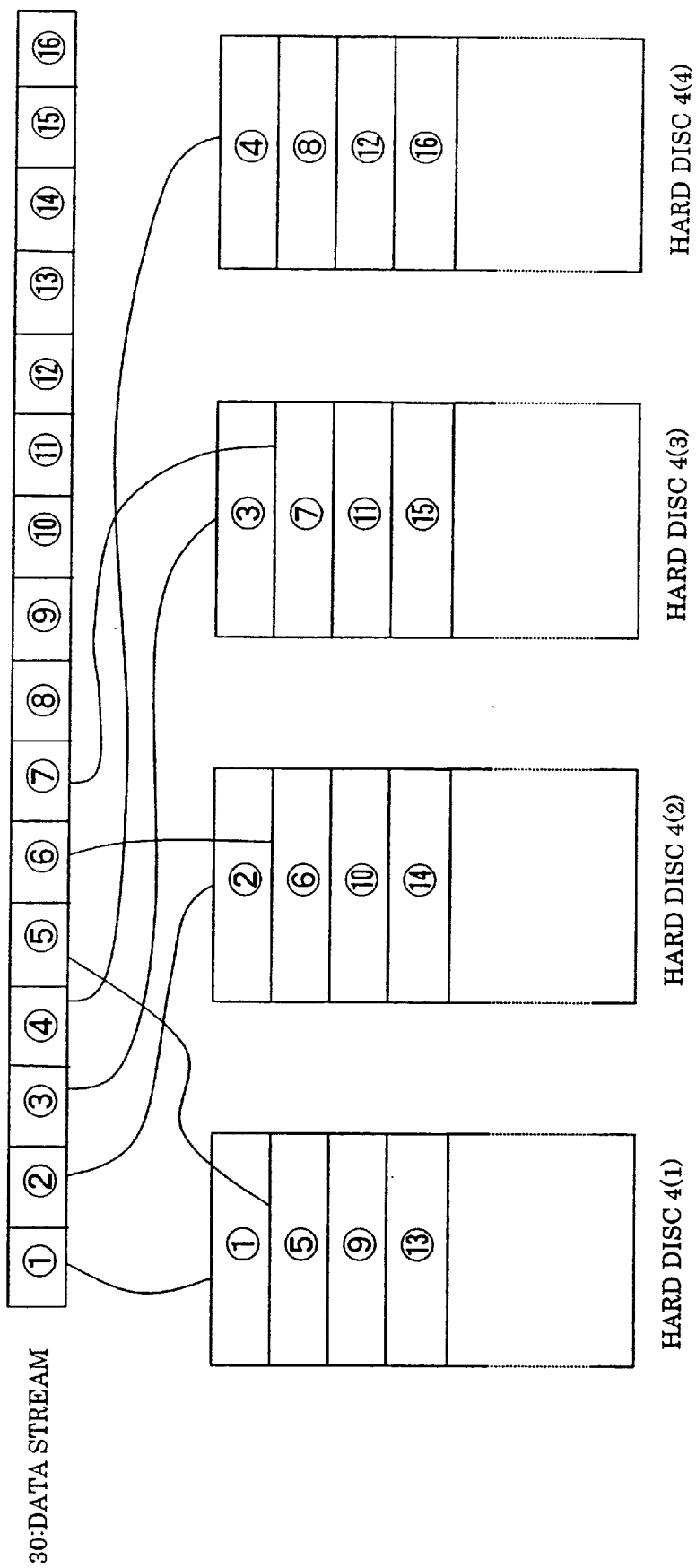
FIG. 2 is a conceptual drawing of the recording format for hard disc.

FIG. 2 is a conceptual drawing of the recording format of the data in prescribed size (hereinafter referred to as fixed-size block) constituting a data stream on the respective hard discs 4(k). The data stream which is input from the I/O adaptor 10 is transferred to the memory 5 in the state divided into fixed-size blocks ①, ②, - - -, and serially recorded in the order of fixed-size block ① on hard disc 4(1), fixed-size block ② on hard disc 4(2), fixed-size block ③ on hard disc 4(3), etc.

Figure 3:
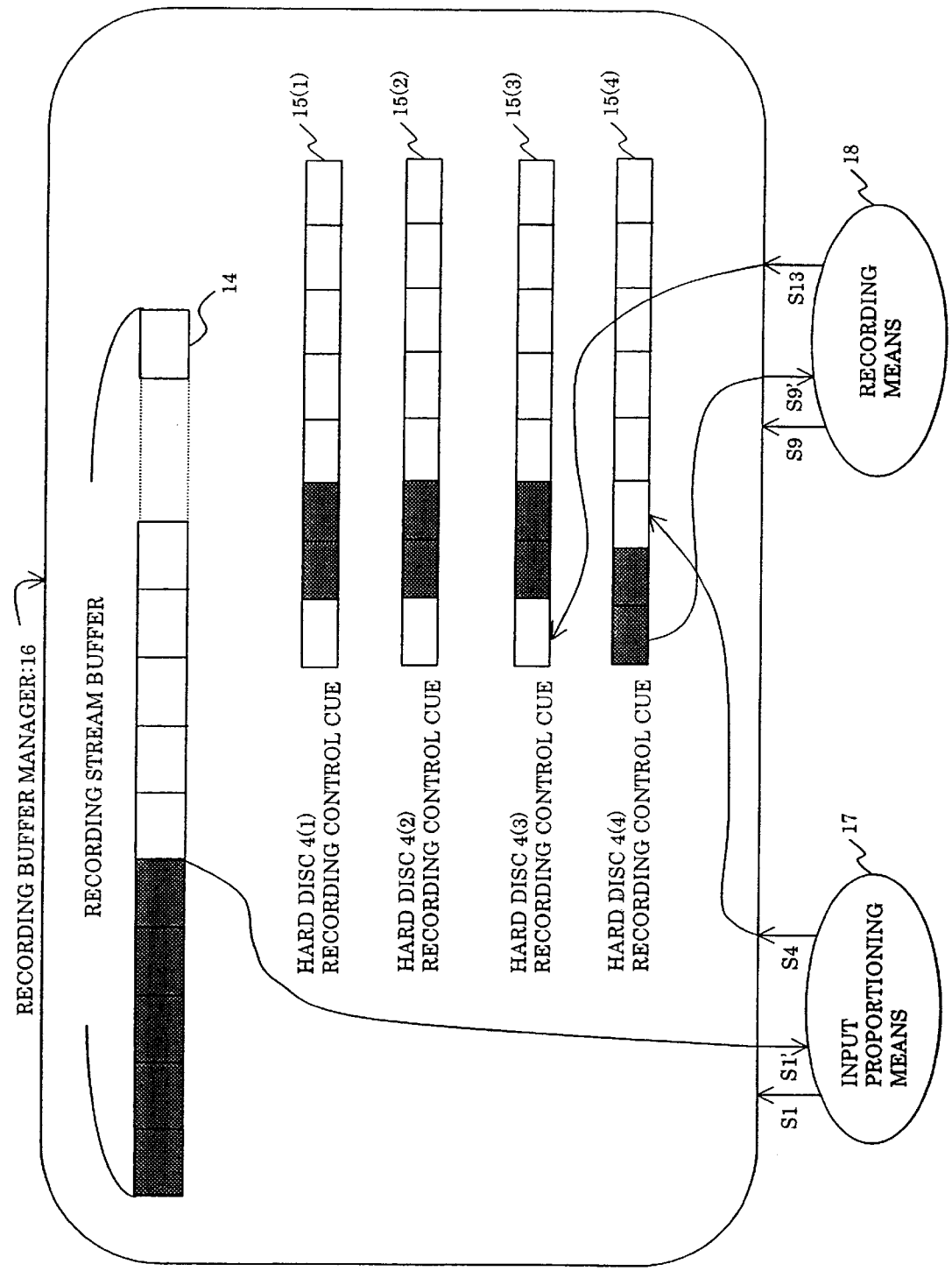
FIG. 3 is a more detailed functional block diagram showing the proportioning & recording of the present invention.

FIG. 3 indicates the conception of control procedure made by the recording controller 111 of the control unit 11. Said recording controller 111 is composed of a recording buffer manager 16, an input proportioning means 17 and a recording means 18 to be further described below.

Said input proportioning means 17 takes charge of the processing of not only transferring the data stream input through the I/O adaptor 10 to an optional area of the memory 5 in units of fixed-size block but also proportioning the data split into units of fixed-size block on the memory 5, in correspondence to said respective hard discs 4(k).

Moreover, said recording means 18 takes charge of the processing of recording the data in units of fixed-size block transferred to an optional area of the memory 5 by said input proportioning means 17, on the respective hard discs 4(k) to which the data are assigned. Those processings by 2 different means can be performed in parallel.

The recording buffer manager 16 is provided with a function of controlling recording stream buffer 14 and recording control cue 15 described below. The recording stream buffer 14 is formed in the memory 5 for saving the data stream, which is input in the memory 5 by the I/O adaptor 10, by fixed-size blocks. Moreover, said recording control cue 15, which registers the addresses of the recording stream buffer 14 in which are saved said respective block data to be recorded on the respective hard discs 4(k), is constructed in correspondence to each of said hard discs 4(k). Furthermore, said input proportioning means 17 and recording means 18 perform the recording & reproduction control described below, by obtaining information from the recording buffer manager 16.

Figure 4:
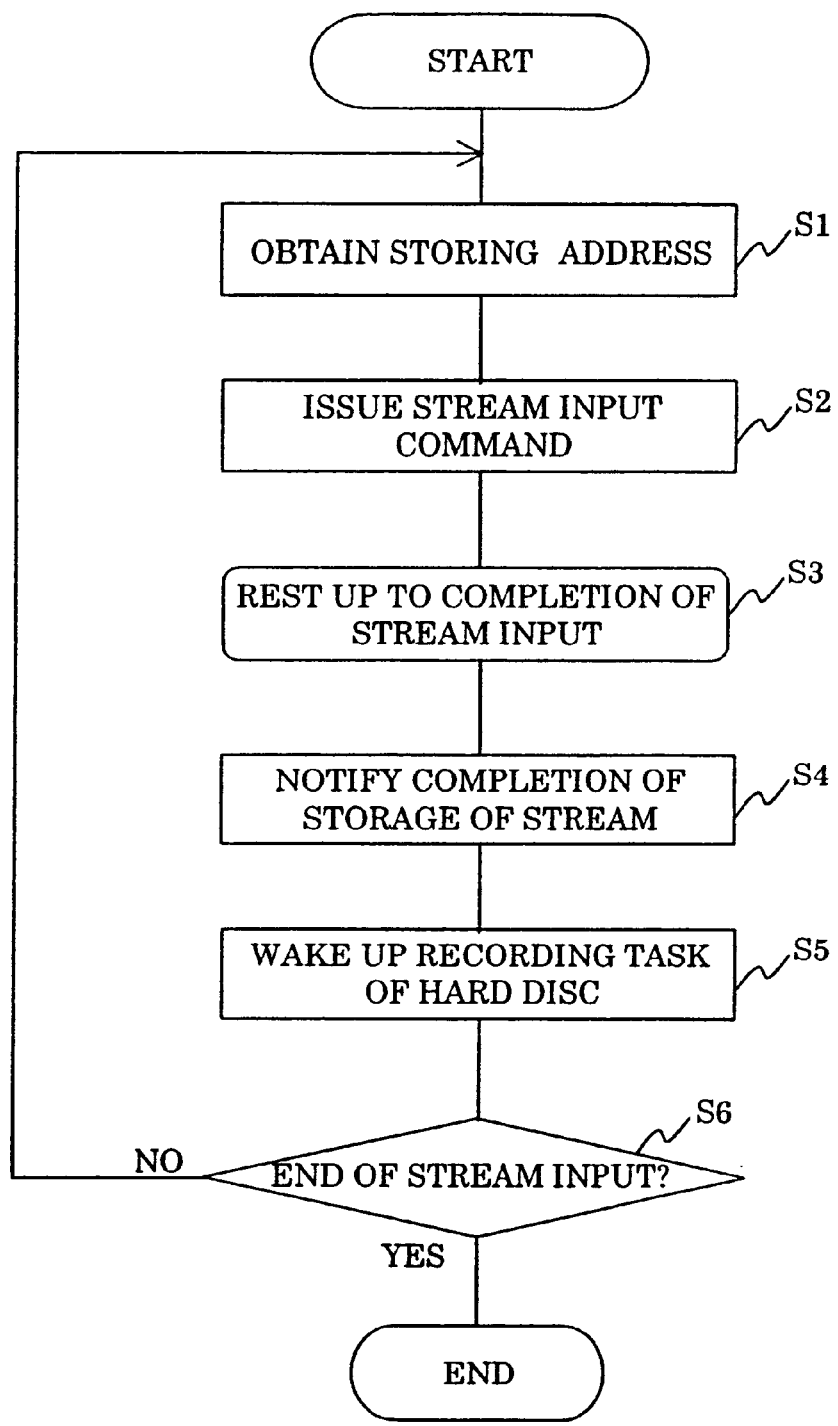
FIG. 4 is a flow chart showing the input proportioning of the present invention.
Figure 5:
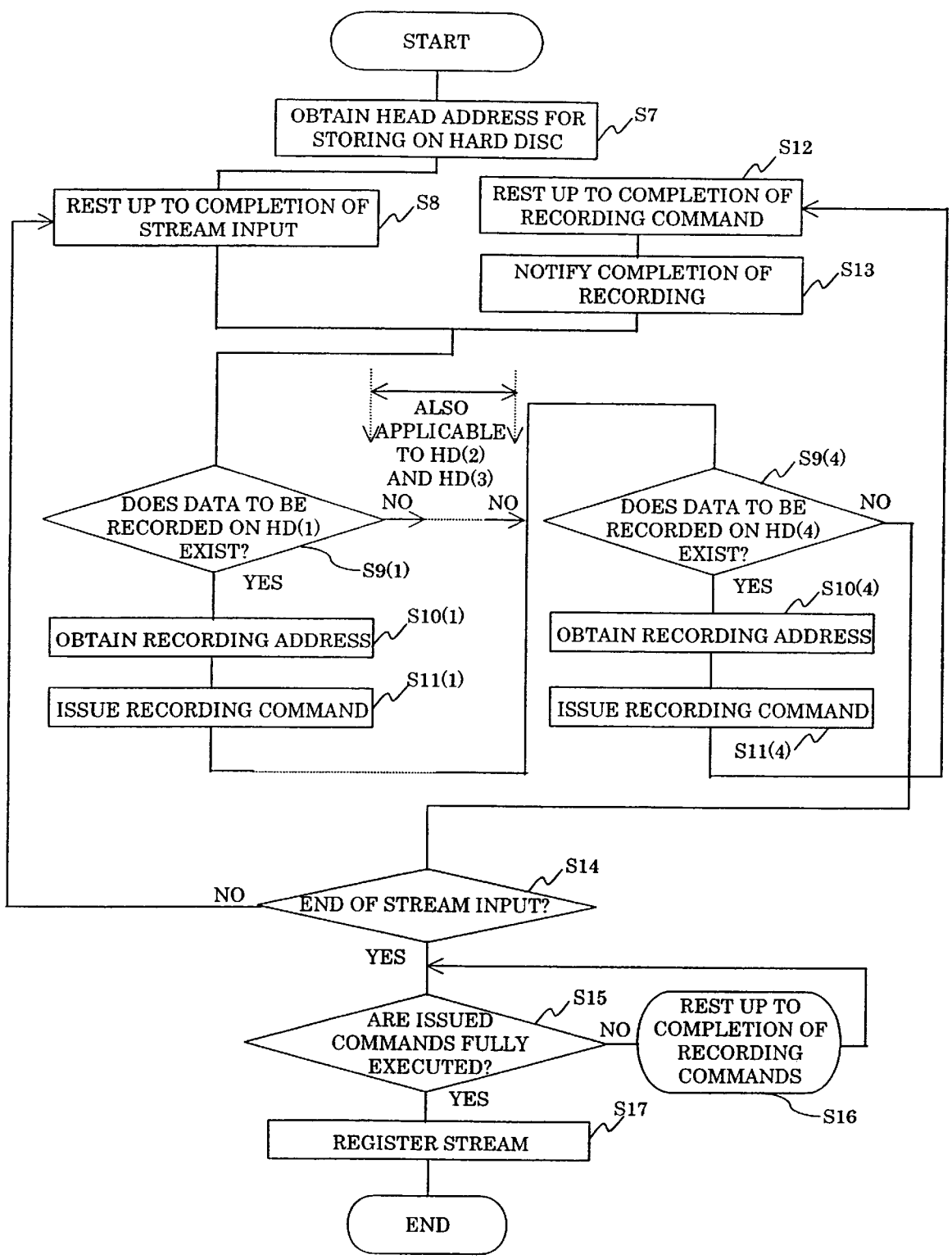
FIG. 5 is a flow chart showing the recording of the present invention.

FIG. 4 and FIG. 5 are flow charts showing the respective working procedures of the input proportioning means 17 and the recording means 18. The recording procedure for recording a stream data on hard discs 4(k) will be explained in detail hereafter by using FIG. 1, FIG. 2, FIG. 3, FIG. 4 and FIG. 5.

In case there is any necessity of recording stream data on the hard discs 4(k), the processing at the input proportioning means 17 and the recording means 18 of the recording controller 111 starts, under the control of the CPU 9. Said case of necessity refers to cases where the operator gave a recording instruction from mouse, etc. at required point in time while watching the monitor on which to display the image to be input on the I/O adaptor 10, provided outside the I/O adaptor 10, etc.

With that operation, first the input proportioning means 17 obtains an address of the recording stream buffer 14 formed in the memory 5 to record the data input in fixed-size blocks, from the recording buffer manager 16 (step S1).

The input proportioning means 17 gives an instruction to said I/O adaptor 10 to record the stream data to be input from I/O adaptor 10 in the address thus obtained (step S2) and, based on this instruction, the I/O adaptor 10 records a piece of data of fixed block size in the prescribed address of said recording stream buffer 14. During this recording, said input proportioning means 17 suspends its processing (step S3).

Said memory 5 also secures recording control cues 15 in correspondence to the respective hard discs 4(k). If, in this state, any stream data is input in in the prescribed address of the recording stream buffer 14 in fixed-size blocks, the input proportioning means 17 wakes up to notify the recording buffer manager 16 of the completion of input and set said prescribed address, in which the recording has been completed, on said recording control cue 15 corresponding to the hard disc 4(k) on which to record the contents recorded in the address concerned (step S4).

A data to be recorded is considered as produced at this point in time and, therefore, the input proportioning means 17 wakes up the recording means 18 (steps S5→S8) and, if the input of stream data is over, passes to the procedure of obtaining an address of the recording stream buffer 14 to be saved in the recording buffer manager 16 again (step S1). As described above, the input proportioning means 17 continues processing of data stream input, while securing addresses of the recording stream buffer 14 in which to save the data stream.

On the other hand, the recording means 18 obtains, from the file controller 112, the head address of an open area in the respective hard discs 4(k) (step S7), and suspends processing until the stream data is input (step S8).

In the case where a stream data of fixed-size block is input in the prescribed address of the recording stream buffer 14 as described above, the recording means 18 is woken up by the input proportioning means 17 (steps S5→S8). Here, the recording means 18 inquires of the recording buffer manager 16 about if there exists any data to be recorded in the respective hard discs 4(k) (step S9(k)). Namely, it inquires about whether or not any address of recording stream buffer 14 is written in the recording control cue 15(k) and, at the same time, if there exists some data to be recorded (in the case where some address of recording stream buffer 14 is written in the recording control cue 15(k)), obtains that address (step S10(k)).

After obtaining said address corresponding to the data to be recorded in the respective hard discs 4(k), the recording means 18 notifies both SCSI adaptors 2(k) and controllers 6(k) corresponding to the hard disc 4(k) on which to write the data, of a recording command (step S11(k)). Thereupon, the respective controllers 6(k) which received the command will perform writing of data on the corresponding hard discs 4(k).

In the case where there exist addresses of recording stream buffer 14 to be recorded on all of the hard discs 4(k) for example, all SCSI adaptors 2(k) and controllers 6(k) corresponding to the respective hard discs 4(k) on which to record the data try to obtain monopoly of the PCI bus.

A non illustrated transmission controller controlling arbitration of the PCI bus assigns a time during which the respective controllers 6(k) can become the master for a preset time, and the respective controllers 6(k) monopolize the PCI bus during this assigned time (portion of solid line in FIG. 10 described below) and perform transfer of recording data one after another.

Namely, first, as indicated in FIG. 10, let us suppose a case where recording commands to controllers 6(1)~6(4) were issued (time t1, t2, t3, t4). Here, first the controller 6(1) secures monopoly of the PCI bus and transfers data from the recording stream buffer 14 of the memory 5 to the buffer 7(1) for said preset time [FIG. 10(*a*), (A1-1)]. Next, the data is transferred from the buffer 7(1) to the hard disc 4(1), and this transfer time, which is determined by the performance of the hard disc 4(1), becomes several times longer than said preset time [FIG. 10(*a*), (B1-1)]. During this time, the controllers 6(2), 6(3) 6(4) secure monopoly one after another, to transfer data from the memory 5 to the buffers 7(2), 7(3), 7(4) [FIG.

10: (A2-1), (A3-1), (A4-1)]. After the transfer of the data of 1 fixed-size block (there are 4 fixed-size blocks in total) has been completed with repetition of hose processing steps between the memory 5 and the respective controllers 6(k), the recording means 18 issues a notice of completion of recording to the recording buffer manager 16 (time t11, t12, t13, t14).

The processing for issuing recording commands to the respective controllers 6(k) as above is executed sequentially to the respective controllers 6(k) to be exact, as shown in FIG. 5 (FIG. 5, steps S9(1)~9(4)). However, this processing may well be considered as being executed almost simultaneously because it is much shorter (in units of nanosecond) compared with the subsequent transfer from buffer 7(k) to hard discs 4(k) [FIG. 10: (B1-1), (B-1), (B3-1), - - - ] (in units of millisecond). Moreover, there are also cases where no data corresponding to any specific hard disc 4(k) is stored in the memory 5 and, in such case, no recording command is issued to that hard disc (case of negative answer in steps S9(1)~9(4) in FIG. 5).

As described above, since the transfer from the memory 5 to the buffer 7(k) of the respective SCSI adaptors 2(k) becomes continuous in time, the transfer capacity of the PCI bus 1 can be fully utilized. In addition, recording from the respective buffers 7(k) to the hard discs 4(k) can also be processed in parallel, thus compensating for the difference in transmission capacity between the host bus and the SCSI bus.

After issuing recording commands to the respective hard discs 4(k), the recording means 18 remains in a state of rest during the time when the respective controllers 6(k) are performing the recording on hard discs 4(k). If the recording of any of the hard discs 4(k) (hereinafter explanation will be given by taking the hard disc 4(ko) as example) is completed, the recording means 18 wakes up with the completion of recording, notifies the recording buffer manager 16 of the completion of recording on hard disc 4(ko) and, at the same time, saves the value indicating completion of recording at the position of the corresponding buffer address of the recording control cue 15(ko) corresponding to the hard disc 4(ko) (step S13).

Waking up of the recording means 18 may take place not only at said completion of recording (step S13) but also with a command from said input proportioning means 17 side (step S5) during a recording to either of said hard discs 4(k) (during a suspension of step S12). Also at that time, the recording means 18 inquires of the recording buffer manager 16 about if there exists any data to be recorded on any of the respective hard discs 4(k) (step S9(k)).

At this time, however, the recording on some specific hard disk 4(ko) under execution by said previous step S12 is suspended until the end of that previous recording and, after the previous recording is over, the recording command for the next data is issued (refer to FIG. 11 to be explained later). Therefore, a recording command is notified only to the controller 6(k) of the hard disc 4(k) not currently under recording (step S11(k)). In this way, in the case where the recording command to a certain hard disc 4(ko) is over and some area for recording exists in the next hard disc 4(k1), a recording command for it is notified immediately to minimize the idle time of the host bus 1 concerned.

Even in case some series of recording is interrupted for some reason or another as a result of said processing, the recording can be continued without any shortage of stream data if the recording on hard disc 4(k) is resumed by the time when there is no more open space in the recording stream buffer 14 controlled by the recording buffer manager 16.

In the case where there exists no address for recording (address of recording stream buffer) in the recording control cue 15(k) of the respective hard discs 4(k) and that the input of stream data is over (step s14), (the recording controller 111) makes sure that all issued commands have been completed and then notifies the file controller 112 of the recording information of the recorded stream to end the recording operation (steps S15→S16→S17).

[Embodiment 2]

Next, explanation will be given on the processing for the reproduction control of data stream in the reproduction controller 113 of the control unit 11. The reproduction controller 113 is further composed of a reproduction buffer manager 19, a readout means 22 and an output means 23 to be described hereafter.

Figure 6:
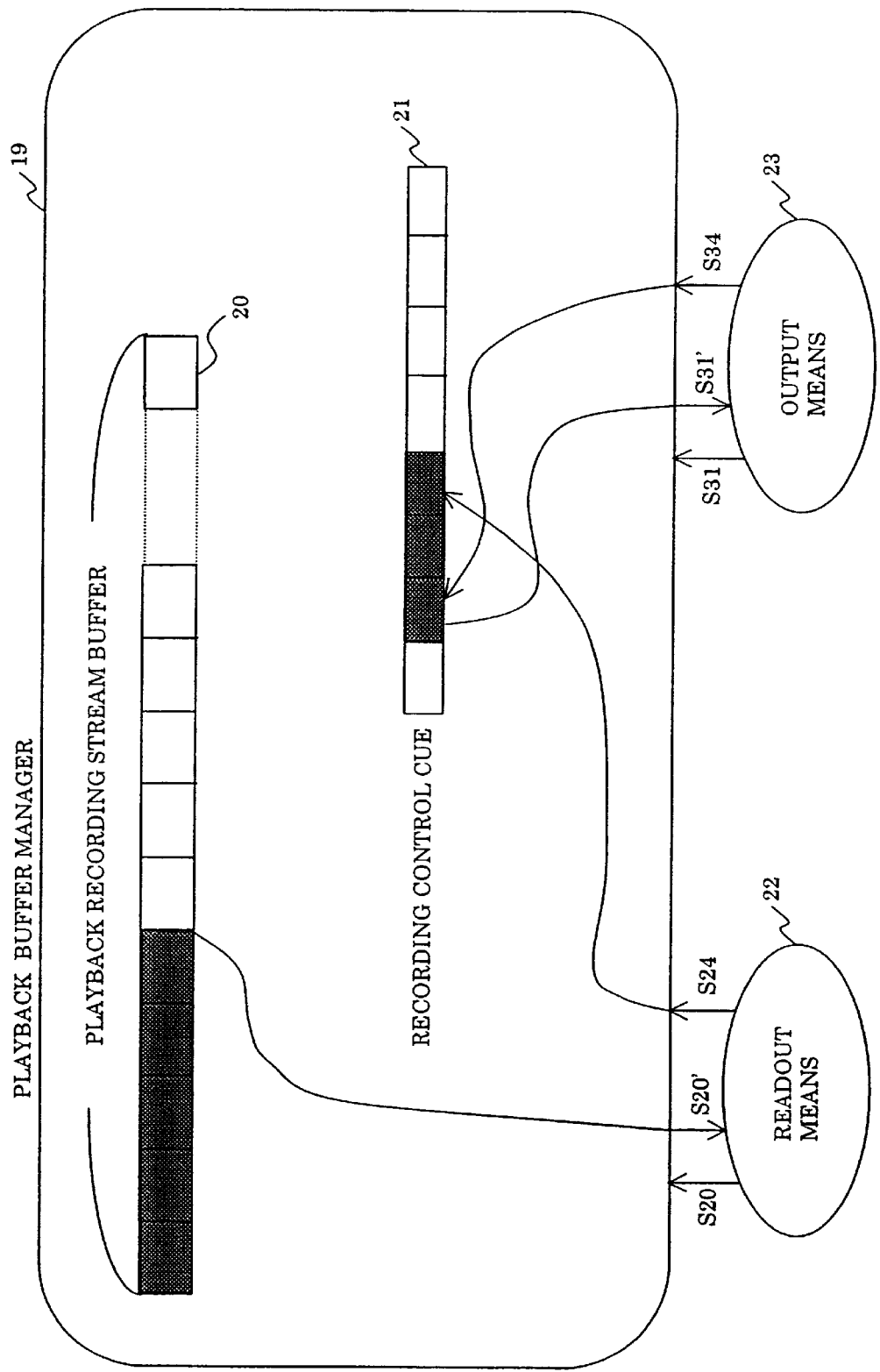
FIG. 6 is a more detailed functional block diagram showing the reproduction of the present invention.

FIG. 6 is a conceptual drawing showing the reproduction control of stream. This reproduction consists of a processing for reading out the data in fixed-size blocks sequentially from the respective hard discs 4(k) by means of the readout means 22 and recording them in optional areas of the memory 5 so that the data stream may be reproduced, and a processing for outputting the data saved in optional areas of the memory 5 as mentioned above as stream data by making the units of fixed-size block continue with the output means 23.

The reproduction buffer manager 19 is provided with a function of controlling the reproduction stream buffer 20 secured in the memory 5, on which to save stream data divided into fixed-size blocks, and the readout control cue 21 registering the address of that buffer, while said readout means 22 and output means 23 execute reproduction control by obtaining information from the reproduction buffer manager 19.

Figure 7:
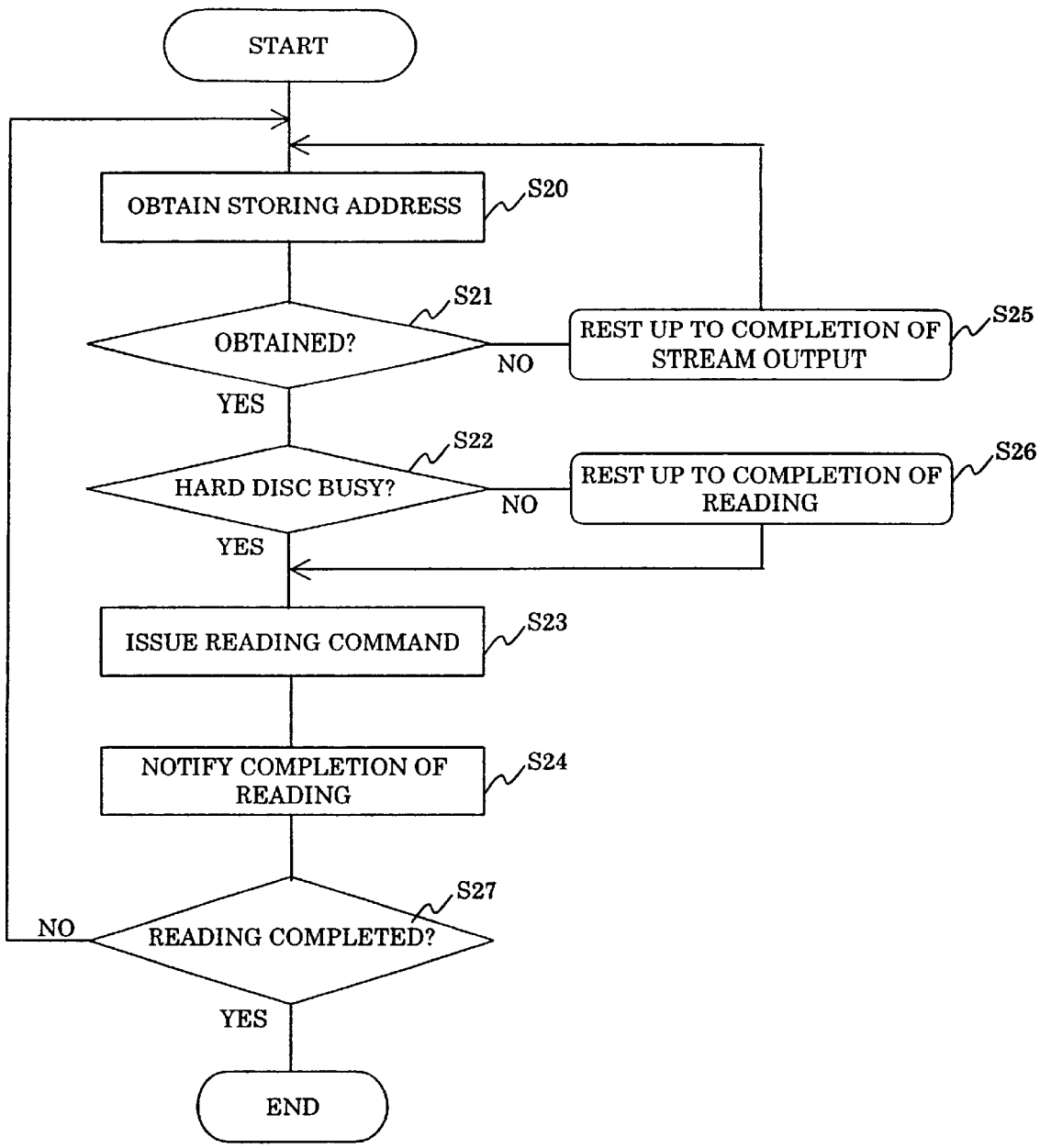
FIG. 7 is a flow chart showing the readout of the present invention.
Figure 8:
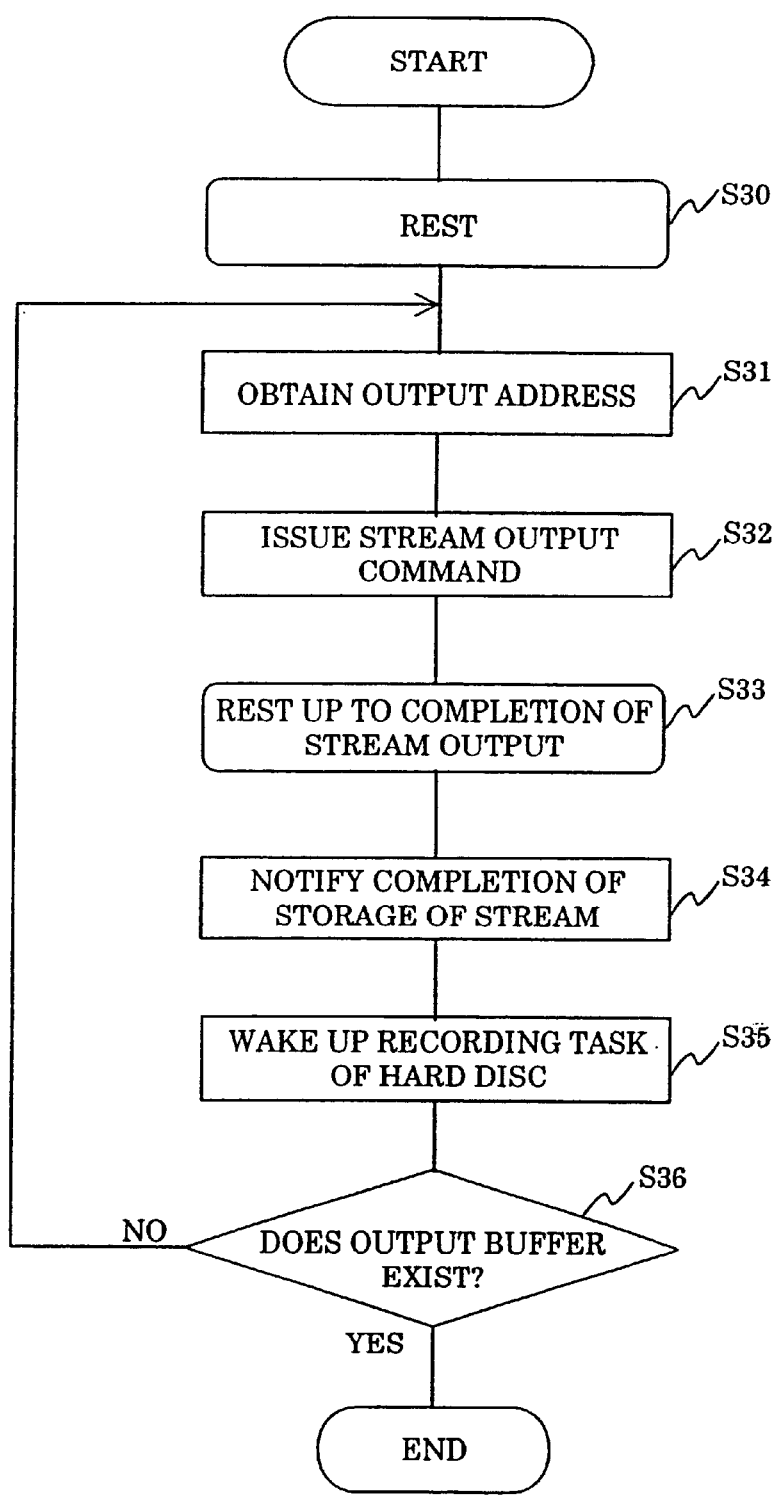
FIG. 8 is a flow chart showing the outputting of the present invention.

FIG. 6 and FIG. 7 are drawings showing the respective flow charts of the readout means 22 and the output means 23 in the control for reproducing stream data. The control up to reproduction of high-speed stream will be explained in detail by using FIG. 1, FIG. 2, FIG. 5, FIG. 6 and FIG. 7 hereafter.

In case there is any necessity of reproducing stream (case where instruction from the operator, or instruction for reproduction on the software was issued to He the controller 6(k) of the respective SCSI adaptors 2(k)), the processing by the readout means 22 and the output means 23 will start under the control by the CPU 9.

The readout means 22 searches the head address of the area in which is saved the data to be reproduced, with the file controller 112. Moreover, it also searches an open area of the reproduction stream buffer 20, with the reproduction buffer manager 19. If no open area is found in the reproduction stream buffer 20 at that time, it means that all areas of the reproduction stream buffer 20 are in the state storing readout data and, therefore, the readout means 22 remains in a state of rest until any open area is produced with outputting of that data (steps S21→S25).

At the point in time when the address of the reproduction stream buffer 20 is obtained, the readout means 22 calculates the order and areas of the hard discs 4(k) to be read out, from the head address information of the area in which is saved the target data from the file controller 112 of the control unit 11, and notifies the controller 6(k) corresponding to that hard disc 4(k) of a readout command (step S23).

Since the data stream is stored in the respective hard discs 4(k) in units of fixed-size block as shown in FIG. 2, supposing that the first data of that data stream is stored in the hard disc 4(1) for example, first a readout command is notified to the controller 6(1) corresponding to the hard disc 4(1), and then readout commands are notified one after another to the controllers 6(2)~6(4) corresponding to the hard discs 4(2), 4(3), 4(4). (The step S22 will be explained hereafter.)

When notifying the hard disc 4(1) of a readout command by obtaining the next storing buffer, i.e. from the second time onward of having access to that hard disc 4(1), the readout means 22 checks that hard disc 4(1) to see if the execution of the previous readout command has been completed or not (step S22). If the previous readout is not yet completed at this time, the readout means 22 will stop until the end of that readout operation (step S26). When the previous readout is over, the readout means 22 will give a readout command to the controller 6 of the hard disc 4(1) in the same way as above (step S23).

Each time when readout commands are issued and the readout of respective fixed-size blocks in the memory 5 is completed as described above, the readout means 22 notifies the reproduction buffer manager 19 of the completion of readout, and sets their addresses from the head of the readout control cue 21 (step S24). In the same way, the readout means 22 performs similar processing also for the hard discs 4(2)~4(4).

As said processing is continued, there will be no more open area in the reproduction stream buffer 20 controlled by the reproduction buffer manager 19, and the readout means 22 can no longer obtain storing buffer addresses. Therefore, when the reproduction stream buffer 20 is fully occupied, the output means 23 is woken up and the readout means 22 gets into a stop state (step S25). Moreover, as explained hereafter, after completing output of one fixed-size block, the output means 23 wakes up the readout means 22 which is in a stop state (step S35).

Next, the processing by the output means 23 will be explained. Immediately after starting, the output means 23 remains in a stop state and, as described earlier, is woken up by the readout means 22 when the reproduction stream buffer 20 of the reproduction buffer manager 19 is fully occupied (step S30), and obtains an address of the reproduction stream buffer 20 to which to have access from the reproduction buffer manager 19 (step S31). Next, the output means 23 notifies the I/O adaptor 10 of a command for outputting the data in fixed-size block stored in the address concerned (step S32), and gets in a stop state until that data in fixed-size block is output and this data output is completed (step S33).

The output means 23 wakes up at the point in time when said output of fixed-size block is completed, notifies the reproduction buffer manager 19 of the completion, and sets the value indicating the completion of output on the readout control cue 21. At that time, one open space is produced in the reproduction stream buffer 20 because the output command to one fixed-size block has been completed. Here, the output means 23 wakes up the readout means 22 and, as a result, performs a processing for obtaining the address of the open area (step S20), thus enabling constant readout into open areas.

In case the readout command from hard disc 4(k) did not end for some reason or another, no interruption of stream data output is produced if the readout operation is resumed by the time when the output means 23 completely outputs the stream data, the readout of which has been completed, set on the reproduction stream buffer 20. Moreover, since said processings by the readout means 22 and the output means 23 are made in parallel, the transfer capacity of the PCI bus is effectively utilized.

So far, explanation has been given separately for the recording of stream data and its reproduction, but there are also cases in which said recording and reproduction take place simultaneously with this system. In such a case, it is possible to reduce the waiting time for rotation of the hard disc 4(k) and the seeking operation of the head and improve the transfer time, by increasing the block size of the data to be recorded on the respective hard discs 4(k) as much as possible.

[Embodiment 3]

FIG. 9 is a drawing indicating, in a recording stream buffer 14 for temporarily storing stream data to be recorded, the order of storing of stream data for each of the cases where the block size of the data to be recorded on the respective hard discs 4(k) is equal to fixed-size block×2, fixed-size block×3, and fixed-size block×4 respectively.

Explanation will be given hereafter on the processing of varying the block size for the processing by the recording buffer manager 16, in case of occurrence of a simultaneous processing of recording and reproduction, by using FIG. 1, FIG. 2, FIG. 3, FIG. 4, FIG. 5 and FIG. 9.

The block size of the data to be recorded on the respective hard discs 4(k) will be set for [fixed block size×n (n is a natural number)]. When the input proportioning means 17 obtains a buffer address from the recording buffer manager 16 (step S1), the input proportioning means 17 searches "n" pieces of area which are continuously left free in the recording stream buffer 14, and obtains the address of the head area of those "n" pieces of area. At this point in time, those "n" pieces of area are considered as reserved and, for the next obtainment of buffer address by the input proportioning means 17, the input proportioning means 17 will search "n" pieces of continuous area other than the "n" pieces of continuous area previously searched, and notifies the address of their head area.

This processing will be made for the number of pieces of the hard disc 4(k). To be concrete, at n=2, the input proportioning means 17 will obtain, as shown in FIG. 9(1), 0, 2, 4, 6 in order, as address of the recording stream buffer 14 corresponding to the first data of 2 consecutive block data. In the same way, at n=3, the input proportioning means 17 obtains, as shown in FIG. 9(2), 0, 3, 6, 9, as address of the recording stream buffer 14 corresponding to the first data of 3 consecutive block data, and, in the case of n=4, obtains, as shown in FIG. 9(3), 0, 4, 8, 12, as address of the recording stream buffer 14 corresponding to the first data of 4 consecutive block data.

Moreover, the input proportioning means 17 obtains 1, 3, 5, 7 as address corresponding to the second block data at n=2, obtains 1, 4, 7, 10 as address corresponding to the second block data at n=3, and obtains 2, 5, 8, 11 as address corresponding to the third block data at n=3. Furthermore, the input proportioning means 17 obtains 1, 5, 9, 13 as address corresponding to the second block data, 2, 6, 10, 14 as address corresponding to the third block data and 3, 7, 11, 15 as address corresponding to the fourth block data at n=4.

As a result, the data stream 30 is stored in the recording stream buffer 14 as shown in FIG. 9(1) at n=2, as shown in FIG. 9(2) at n=3, and as shown in FIG. 9(3) at n=4. In the recording control cue 15 of each hard disc 4(k) is registered the address of the head area of the "n" pieces of area at the time of notification of completion of input (step S4) due to storing of the stream data in the last area of the "n" pieces of area, and the recording means 18 obtains (fixed block size×n) as block size (step S10). As a result, a recording command in the size of fixed block size×n is notified to the controller 6 corresponding to the respective hard discs 4(k) (step S11).

When the recording is over and the recording means 18 notified the recording buffer manager 16 of the completion of recording, the "n" pieces of area from the head in that area will be made free. With this series of operations, (the stream data) is saved in the respective hard discs 4(k) in the format indicated in FIG. 2, thus making it possible to record large sized data without changing the readout control for reproduction.

For the above-described processing, it is necessary to secure, as the minimum required limit, an amount of memory equal to fixed block size×n×number of hard discs 4(k)×2 on the part of the recording stream buffer 14. Therefore, control is made by deciding the value of "n" in such a way that the memory size of the recording stream buffer 14, which can be secured by the computer, may be larger than (fixed block size×n×number of hard discs×2). Here, the portion (fixed block size×n×number of hard discs) means 1 cycle at the time when (the data stream 30) is stored in the recording stream buffer 14 in units of "n", and the multiplier 2 placed at the last position means that a capacity for 2 cycles is required.

By such control, it becomes possible to select an optimal block size from a limited capacity of memory, and transfer the data efficiently.

[Embodiment 4]

Figure 14:
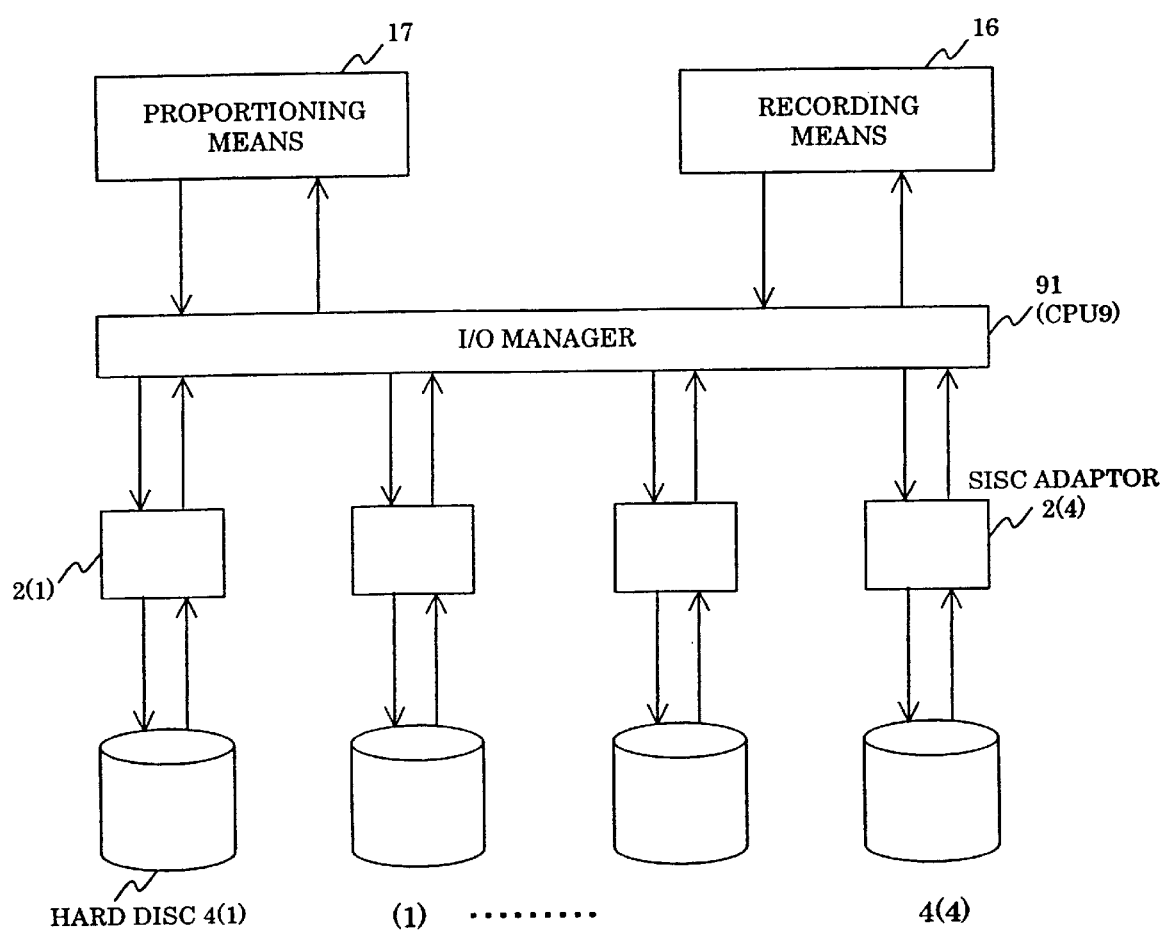
FIG. 14 is a construction drawing showing the conception of multitask.

In the description given above, a plural number of SCSI adaptors 2(k) are made to work in parallel chronologically on the assumption that a multitask type OS is used. Namely, as shown in FIG. 14, in a multitask type, even in case commands (recording commands) for a plural number of devices (a plural number of SCSI adaptors 2(k) in this case) were issued in a way to overlap with one another, those plural number of commands can be processed sequentially with arrangement by the I/O manager 91 of the CPU 9.

However, in the above description, if attention is paid to one hard disc 4(k), as shown in FIG. 11, when said recording means 18 issues a recording command (FIG. 5, step S11), that recording command is notified to the SCSI adaptors 2(k) (hard disc 4(k)) through the I/O manager 91 of the CPU 9. This makes it possible to record the data on the hard disc 4(k) within the prescribed time (black arrow mark in FIG. 11) and, as the recording means 18 gives a notice of completion of recording, the data of the next unit is recorded (FIG. 5, step S13, FIG. 11, time T1→T2→T3→T4 - - - ). The state in which a plural number of SCSI adaptors 2(k) are working by such processing procedure is as shown in said FIG. 10.

However, with the use of said multitask type OS, the I/O manager 91 of the CPU 9 can accept a plural number of commands for one SCSI adaptors 2(k), and keep them on standby for a required time. The number of commands M which can be accepted at that time may be set optionally in the designing stage.

Figure 13:
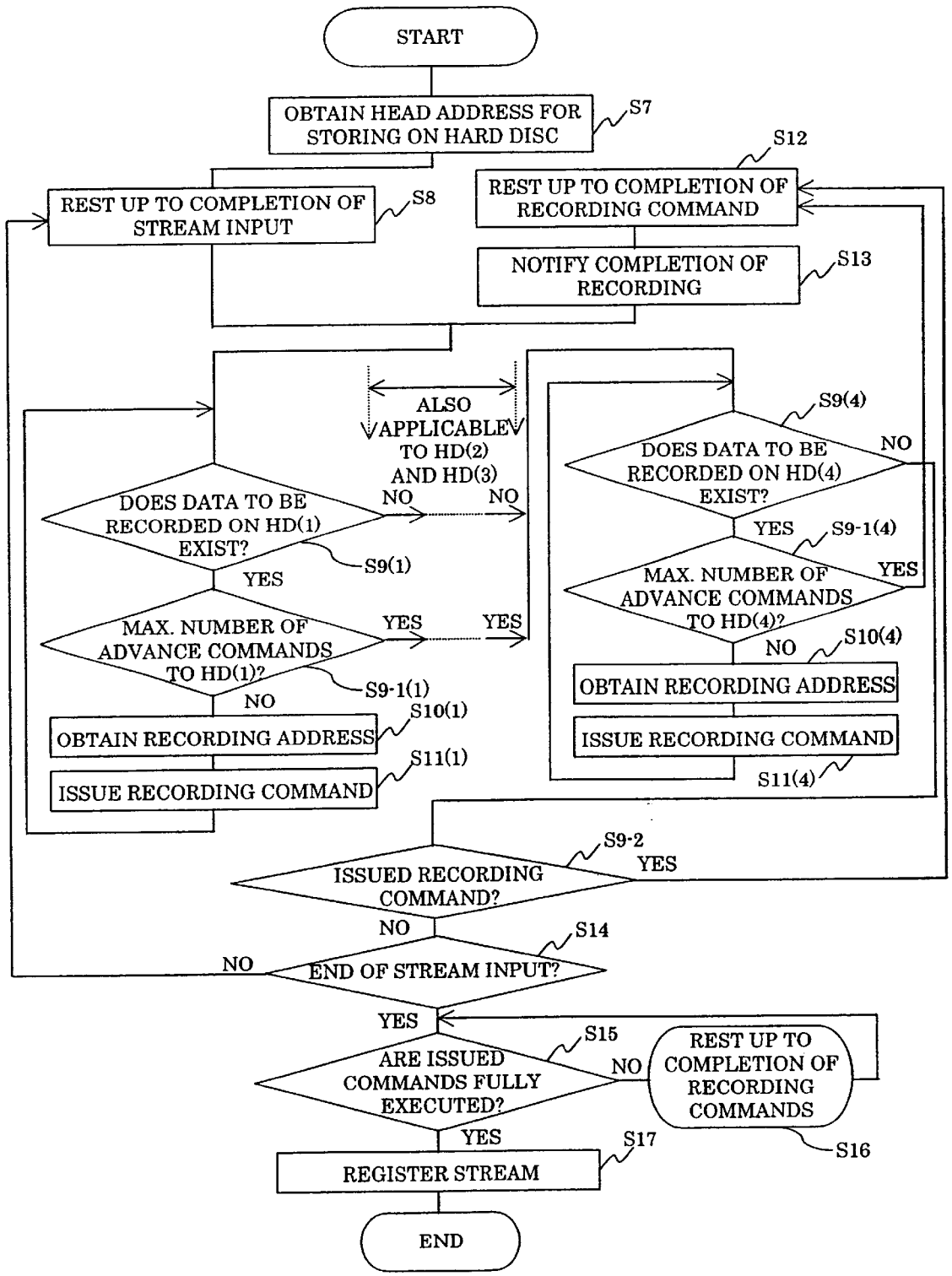
FIG. 13 is a flow chart of a still another embodiment of the present invention.

This system applied to the present invention follows the procedure as shown in FIG. 13. Namely, in the case where there exists some data to be recorded on hard disc 4(1) on the memory 5, the procedure of issuing a recording command is the same as that indicated in said FIG. 5, but if the data to be recorded on hard disc 4(1) existing on the memory 5 is a data in a plural number m of fixed-size blocks, said I/O manager 91 will accept recording commands in the number (M) acceptable by the CPU 9 as mentioned earlier (or m in the case of m<M). Moreover, the processing for other hard discs 4(k) will also be made in the same way (FIG. 13, steps S9(k)→91(k)).

In the case where a plural number of recording commands are issued as described above, the recording commands other than the first recording command are kept on standby on the CPU 9 without being executed until the transfer based on the first recording command is terminated. Now, let us put the number acceptable by the CPU 9 as M=2 and suppose that there exist no less than 2 fixed-size blocks to be recorded on hard disc 4(1) on the recording stream buffer 14 of the memory 5.

Under this situation, 2 recording commands to hard disc 4(1) are issued consecutively at the time T11 as shown in FIG. 12 and, here, while the first recording command is being executed, another recording command remains on standby on the I/O manager 91. Next, about at the same time as the I/O manager 91 receives a notice of completion of recording from the controller 6(1) (SCSI adaptor 2(1)) (Time T21), the next recording command remaining on standby on the CPU 9 is notified to the controller 6(1).

Furthermore, the notification of completion of recording corresponding to the first recording command from said SCSI adaptor 2(1) is also given directly to the recording means 18 and, on the condition that there exists, in the recording stream buffer 14, a data in fixed size corresponding to the hard disc 4(1), a new recording command is issued (Time T12).

As it is apparent from a comparison of FIG. 11 and FIG. 12, the processing made as described above also enables realization of more efficient transfer. As shown in FIG. 13, in the case where there is some recording command currently under execution, the recording means 18 remains at stop until the processing by that recording command is completed (FIG. 13, step S92:Y→S12). Other processing steps are the same as those in the processing indicated in said FIG. 5.

As explained so far, according to the present invention, in which data transfer from the data source (stream data) to one buffer constituting the recording unit and recording from the buffer to the hard disc are alternately considered, said 2 different kinds of processing are apparently executed simultaneously in a plural number of recording units, and the recording speed sharply improves. Moreover, if the transfer speed of the host bus improves, it also produces an effect of further improving the recording speed and enabling even recording of high-speed stream data.

Moreover, by assigning, in correspondence to the respective hard discs, memories (recording stream buffers) on the computer in which the stream data to be recorded is temporarily saved, an effect is produced of preventing any loss of stream data even in case of interruption of recording to some hard disc or in case the recording cannot be made in time. In addition, if a plural number of recording commands are issued in this case, the recording efficiency can be further improved.

Furthermore, also in the case of reproduction & output of data, by storing the stream data in the recording stream buffer in advance for outputting, it becomes possible to avoid any interruption of output of stream data even in case of interruption of recording to some hard disc or in case the recording cannot be made in time, if the readout from the hard disc is resumed by the time when the output of the stream data stored in the memory is completed.

Still more, if recording control cue corresponding to the respective hard discs is provided separately from the recording stream buffer where the data is temporarily recorded, to record and control addresses only there, it produces an effect of improving the efficiency of use of the memory on the computer.

Yet more, by setting the data size as recording unit at a value equal to "n" times the ordinary transmission unit, it becomes possible to realize high-speed transmission with a decrease in the number of commands to be notified.

[Embodiment 5]

Said method of access to data recorder becomes effective if it is applied to a system which uses a recording & reproduction device capable of high-speed input & output of stream data such as image data, etc., as explained hereafter.

Figure 15:
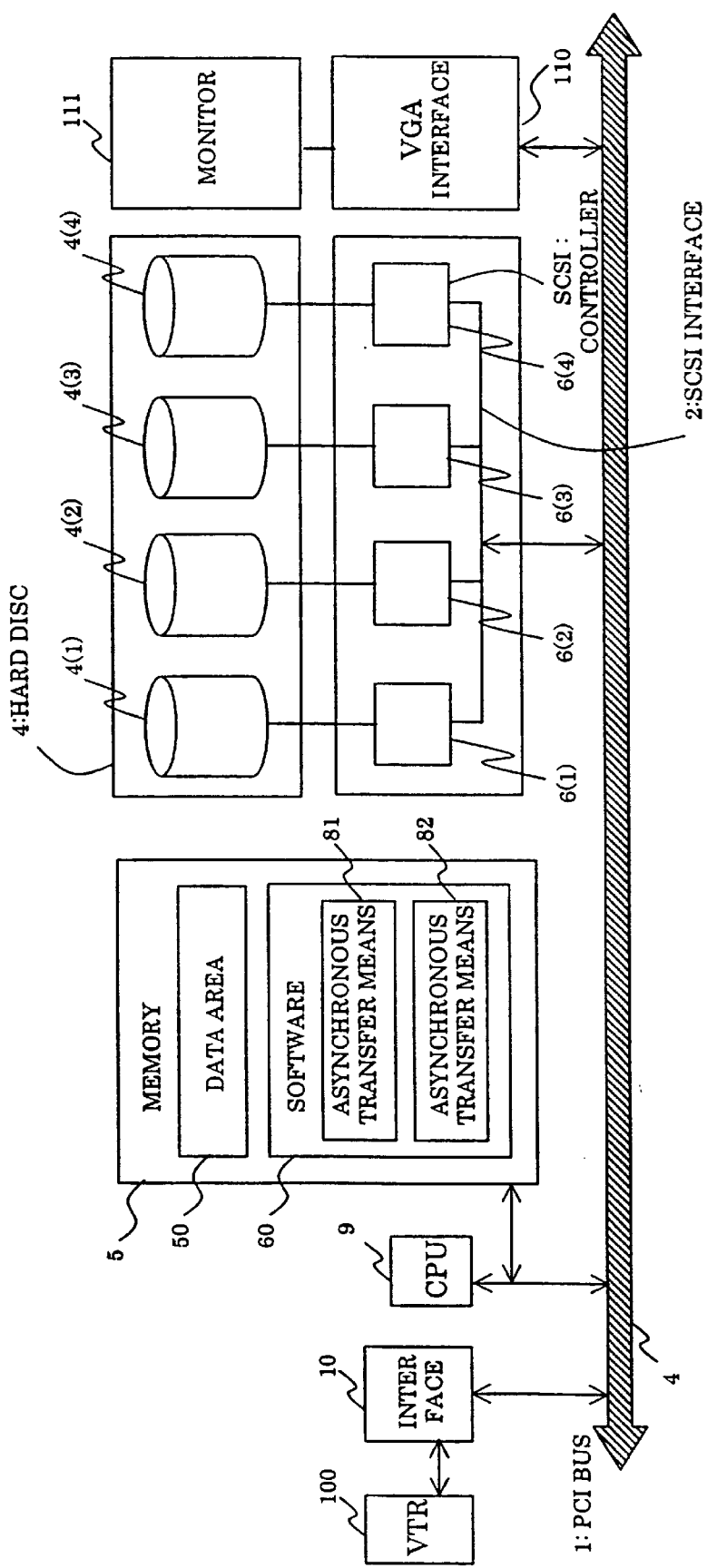
FIG. 15 is a construction drawing of a system to which the present invention is applied.

FIG. 15 is a system construction drawing showing the first embodiment of the present invention.

The VTR 100 is provided with a function of recording and reproducing data of DVC form including image data, audio data and sub-code data. The I/O adaptor 10, which is an interface between the VTR 100 and the PCI bus 4, converts the data output from the VTR 100 into a data in PCI bus form and outputs it on the PCI bus. Moreover, this I/O adaptor 10 also has a function of temporarily storing the data output from the VTR 100.

The data thus output on the PCI bus is controlled by both the software 60 on the memory 5 and the CPU 9, and transferred to the data area 50 of the memory 5.

Said software 60 contains the 1st asynchronous transfer means 81, and this 1st asynchronous transfer means 81 searches a data size enabling burst transfer of PCI bus 4 between the I/O adaptor 10 and the data area 50, and transfers the data by splitting it into a plural number of data blocks of a size not exceeding that data size. Here, it is also possible to decide the data size enabling burst transfer at a time in advance and, even in that case, the data can be transferred in a state split into a plural number of data blocks in the same way as above.

Moreover, transmission from the data area 50 to the VTR 100 through the PCI bus can also be made in the same way by an operation opposite to above. The data in the data area 50 can be output, after processing by the software 60, on the monitor 111 through the VGA interface 110 connected to the PCI bus 4.

Furthermore, it is possible to transfer quadruple speed DVC data, which is a reproduction output of the quadruple speed VTR 100, to the memory 5 through the I/O adaptor 10 as described above, perform AV separation or extraction of sub-code data and other processing operations according to the operator's request in the memory 5, and then accumulate those data in storing means such as hard disc, etc., and deliver them to other application software or output them to outside.

Similarly, the data stored in the memory 5 as described above can also be input or output on the hard disc array 12 through the SCSI adaptor connected to the PCI bus 4, by the 2nd asynchronous transfer means 82. Here, after detecting that the data in DVC form on the memory 5 turned into the predetermined data size (data size equal to 10 frames, for example), said 2nd asynchronous transfer means 82 issues an asynchronous DMA transfer command to the controller 6(1) on the SCSI adaptor 2, for storing a predetermined data size W (W<V: data for 1 frame, for example) other than said data size V in the hard disc 4(1) connected to that controller 6(1).

Next, if the data once stored in the memory 5 turns to said data size V again, said 2nd asynchronous transfer means 82 issues an asynchronous DMA transfer command to the controller b on the SCSI adaptor 2, for storing said data for W frames in the hard disc 4(2) connected to that controller b.

In this way, each time when the data size on the memory 5 becomes V, an asynchronous DMA transfer command is issued by the 2nd asynchronous transfer means 82, and the data in prescribed size W drives the hard discs 4(3), 4(4), 4(1), 4(2), 4(3), 4(1), 4(2), - - - connected to the controllers 6(3), 6(4), 6(1), 6(2), 6(3), 6(4), 6(1), 6(2), - - - on the SCSI adaptor.

By continuously performing such asynchronous DMA transfer, it becomes possible to make very rapid data transfer. Though not described in FIG. 15, the user can control the above-described operation by utilizing well known keyboard or mouse. In the above operation, it is desirable to reduce the size of the data in prescribed size at the start of transfer so that the user may feel the transfer time as short, and then change it to a larger size again after passage of a prescribed time, to secure stability of transmission. Namely, on the hard disc, the recording is made from the outer circumference toward the inner circumference.

At that time, the data speed at the innermost circumference becomes no more than one half of the data speed at the outermost circumference. Therefore, while buffering a comparatively small data volume is enough during a recording on the outer circumference, a larger buffer volume comes to be required as the recording progresses toward the inner circumference.

Moreover, while PCI bus is used in the above explanation, other bus such as ISA (Industry Standard Architecture) bus, etc. may also be used.

Furthermore, while VTR is used as recording & reproduction device, it is also all right to use other recording & reproduction device such as optical disc or hard disc.

Still more, the object data may be data obtained from network instead of data obtained from the recording & reproduction device.

Yet more, the data, which is given as data in DVC form, may also be data in other forms.

In addition, the software 60 may be either application program, device driver or operation system. Moreover, the interface with the hard disc array 12 may be other interface such as IDE (Integrated Drive Electronics), EIDE, etc.

Furthermore, as said 2nd asynchronous transfer means 82, it is of course possible to apply the method of access to data recorder as indicated in said embodiments 1 to 4. In that case, the transfer to the hard disc 4(k) is executed without waiting for accumulation of size V data in the memory 5 as described above.

[Embodiment 6]

The 6th embodiment will be explained by using FIG. 16, hereafter.

Figure 16:
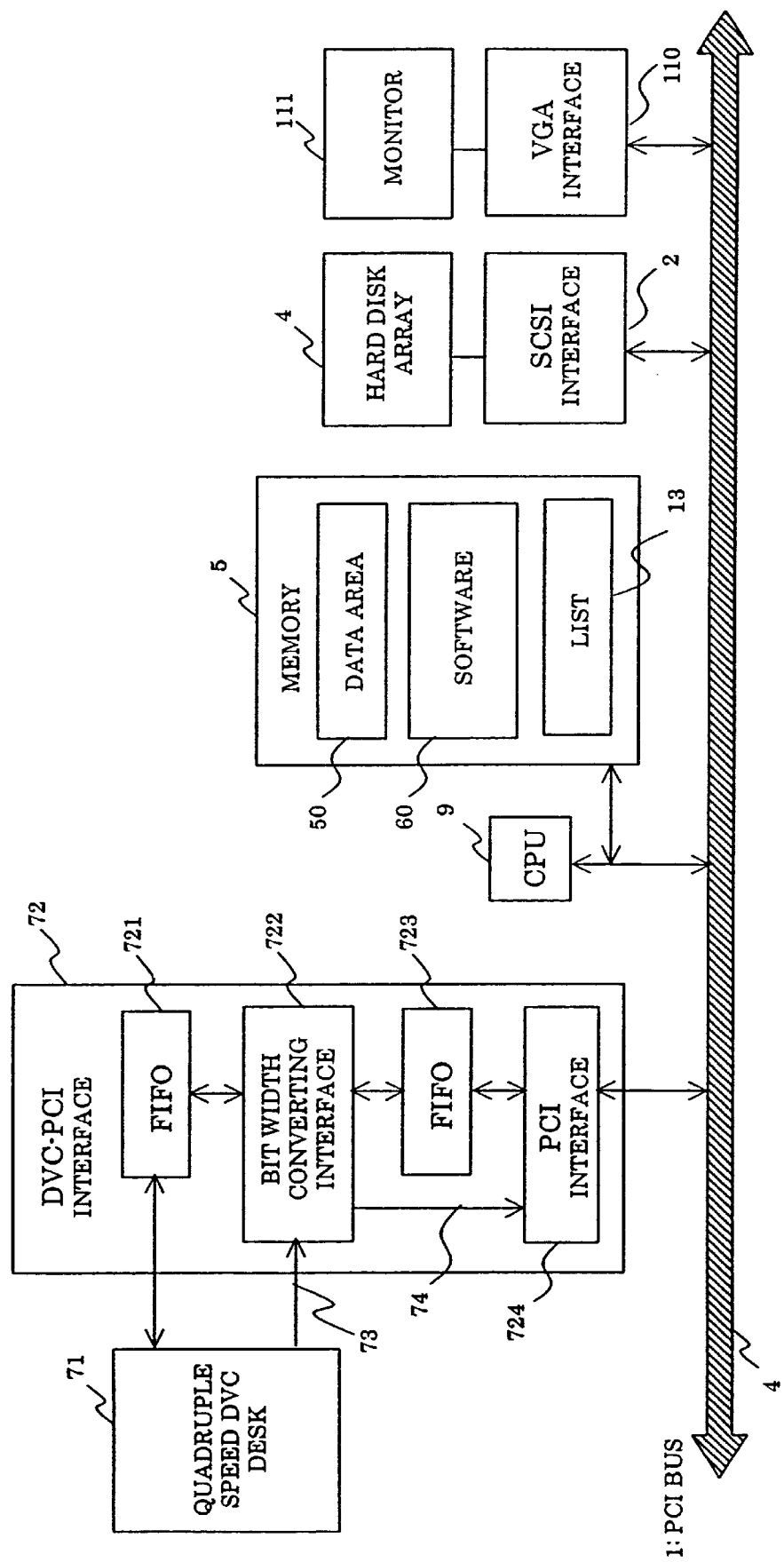
FIG. 16 is a more detailed block diagram of a system to which the present invention is applied.

The quadruple speed DVC deck 71 in FIG. 16 (corresponding to VTR 100 in FIG. 15) can make recording & reproduction of DVC signals at a speed 4 times faster than the normal speed and make input & output in data size necessary for the indication of 4 frames on the display unit during the 1-frame period ($\frac{1}{30}$ second) of the display unit. Moreover, this quadruple speed DVC deck 71 is adapted to the SD format of SVC signals, and the size of DVC data per frame is 120 kilobytes. It is therefore capable of input or output of data in the size of 480 kilobytes in a 1-frame period ($\frac{1}{30}$ second).

The data exchanged between said quadruple speed DVC deck 71 and the DVC-0CU interface 72 is of 8 bits, and is temporarily saved in the FIFO (First-in First-out) buffer 21 at the time of either input or output. Moreover, the quadruple speed DVC deck 71 is adapted to 8-bit data as described above, and the PCI bus 4 is adapted to 32-bit data. Therefore, it is necessary to change the bit width from 8 bits to 32 bits when outputting data from DVC deck 71 to PCI bus 4 but, inversely, from 32 bits to 8 bits when inputting data from PCI bus 4 to DVC deck 71. For that reason, a bit width converting interface 722 is provided on the DVC-PCI interface 72.

The PCI interface 724 is an interface for controlling the input and output of data between the PCI bus 4 and the FIFO buffer 723. The PCI interface 724 obtains address of destination of transfer and transferred data size stored in the destinations list for transfer 13, and performs data transfer while synchronizing the quadruple speed DYC deck 71 as shown in the time chart in FIG. 17.

Said quadruple speed DVC deck 71 also produces frame synchronization signal 73 to synchronize the transmission. This signal is produced at every 1-frame period (1/30 second= approx. 33.3 ms), and is input in the bit width converting interface 722 of the DVC-PCI interface 72. The bit width converting interface 722 generates transfer synchronizing signal 74 by referring to the frame synchronization signal 73, and inputs it in the PCI interface 724. The PCI interface 724 realizes data transmission between a computer working asynchronously and a VTR working synchronously by making input and output on the PCI bus with reference to this transfer synchronizing signal 74 as described earlier.

As shown in FIG. 17(a)(b), data 82 is output from the quadruple speed DVC deck 71 in a volume for 4 frames in one cycle (approx. 33.3 ms) of said frame synchronization signal 73, and is transferred to the FIFO buffer 723 through the FIFO buffer 721 and the bit width converting interface 722. The bit width converting interface 722 produces, by referring to said frame synchronization signal 73, transfer synchronizing signal 74 with a delay by prescribed time from said frame synchronization signal 73 as shown in FIG. 3(c).

Figure 17:
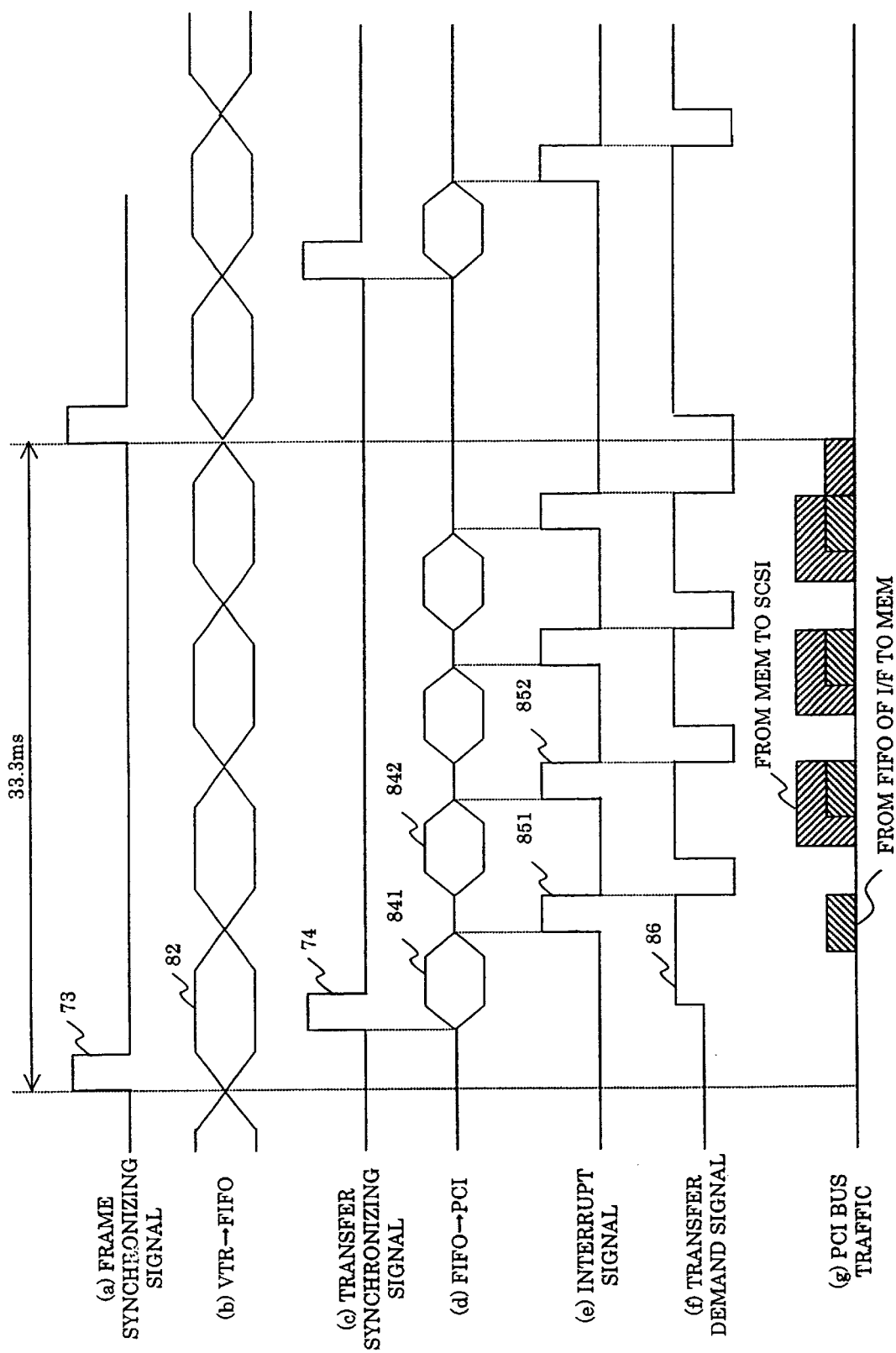
FIG. 17 is a time chart of data transfer in FIG. 16.
Figure 18:
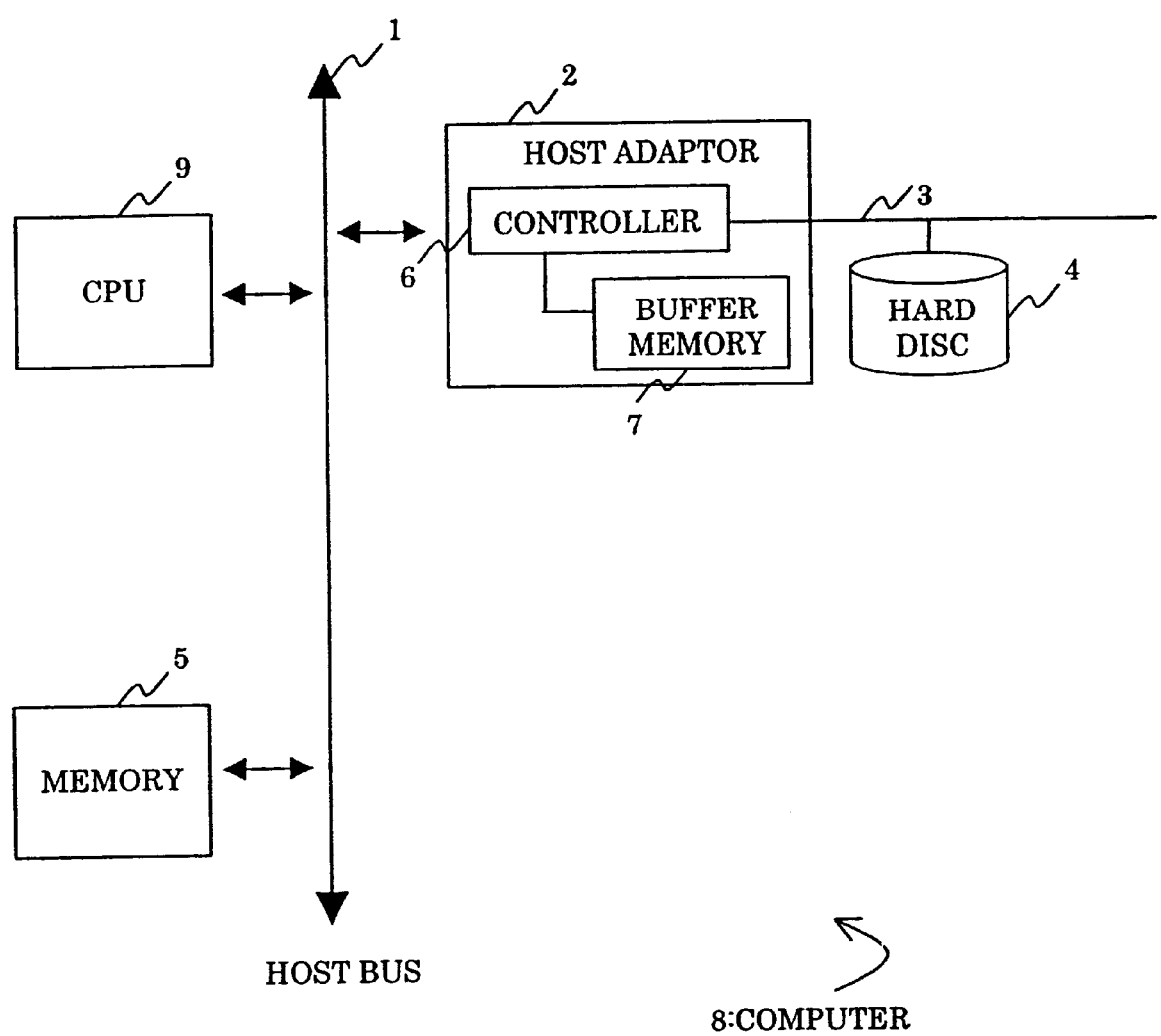
FIG. 18 is a construction drawing showing an example of conventional data recorder.
Figure 19:
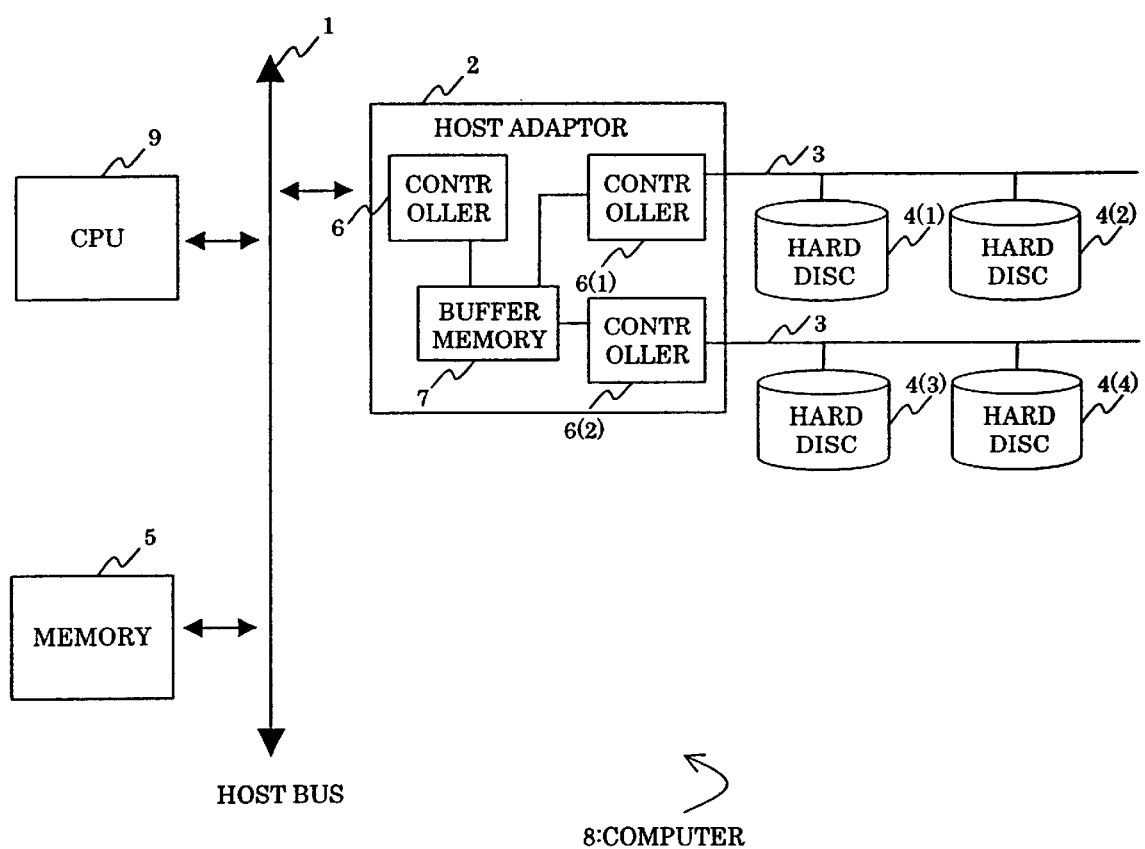
FIG. 19 is a construction drawing showing another example of conventional data recorder.

Said PCI interface 724, while receiving transfer request signal 86 (FIG. 17 (f)) from the CPU 9, performs transfer of data 841 from the FIFO buffer 723 to the PCI bus 4 simultaneously as it detects a transfer synchronizing signal 74 as shown in FIG. 17(d). At that time, the PCI interface 724 transfers data of specified size to the specified address in the data area 50 of the memory 5, by referring to the destinations list for transfer 13 stored in the memory 5.

When this transfer is over, the PCI interface 724 produces an interrupt pulse 851 as shown in FIG. 17(e), and the CPU 9 detects it and the data transfer for one frame is terminated. The software 60 checks the size of the data the transfer of which has been completed with the above processing and, in case the transfer of said specified size is found to be not completed yet as a result of comparison of the transferred size and the size which had been specified in advance, prepares a destinations list for transfer 13 again based on the data size yet to be transferred, and makes a request for the next transfer. In response to this request for transfer, the data 842 is transferred to the memory 5, and the PCI interface 724 produces an interrupt pulse 852.

By repetition of this procedure, data transmission from the VTR 100 is realized. Here, the traffic state on the PCI bus of the data asynchronously transferred by said CPU 9 from the data area 50 of the memory 5 to the SCSI adaptor 6 and the data transferred from said DVC-PCI interface 72 becomes as shown in FIG. 17(g). In FIG. 17(g), said 2 different kinds of data are expressed as if they lapped with each other on the PCI bus but, more microscopically, said 2 kinds of data are transferred on the PCI bus with time sharing.

As described above, the present invention, having an interface for converting DVC data into data adapted to PCI bus interposed between the recording & reproduction unit and the computer, sharply reduces the burden on the computer. Therefore, it can utilize the transfer capacity of the system to the fullest extent, without depending on the system construction. It enables connection between high-speed recording & reproduction VTR or a plural number of VTRs and computer, or connection between network and computer, and can realize efficient and highly reliable high-speed transfer unit free from loss of frame, etc.

Moreover, the present invention, capable of performing conversion to data adapted to PCI bus on the interface and not requiring any conversion in the memory means, can shorten the processing time.

Furthermore, the present invention can also transfer DVC data, which is input at high speed or quadruple speed for example, to the memory means through data bus inside the computer, make AV separation and sub-code data processing in the memory means, and then store the data in real time in the HDD array.

In addition, the present invention makes it possible to perform other tasks such as non-linear editing or reproduction of separate stream, etc. for example, concurrently while making a high-speed transfer.

What is claimed is:

1. A data recorder equipment with a recording unit composed of a host adaptor connected to a host bus and recording medium connected to the host adaptor, comprising:

a group of recording units composed of a plural number of sets of said recording unit, an input proportioning means for splitting the data to be recorded into prescribed size units and assigning said split data to a plural number of recording media so that the respective recording media may become a single logical recording space, and a recording means for issuing commands the respective host adaptors to transfer said assigned data in prescribed size to the respective recording media, wherein said input proportioning means temporarily holds said split data in a memory in correspondence to the respective recording units, and then said recording means issues recording commands said respective recording media based on the state of saving in the memory, and said input proportioning means records said split data one after another in a continuous space in said memory and records the addresses of the space in which said data is recorded in another space in said memory in correspondence to the respective recording units.

2. The data recorder as defined in claim 1, wherein said input proportioning means is further provided with a function of receiving input data.

3. The data recorded as defined in claim 1, wherein, upon completion of the data transfer in prescribed size to the recording medica, said recording commands are issued one by one subject to holding of the next data in prescribed size on the memory.

4. The data recorder as defined in claim 1, wherein, at the point in time when the data transfer in prescribed size is held on the memory, said recording commands are issued in the same number as an optionally decided number M or the number of units m of the data held on the memory in the range m<M.

5. The data recorder as defined in claim 1, wherein the prescribed size of said split data is a fixed size used as unit of transmission.

6. The medium, characterized in that it records a program for having the whole or part of the respective control methods indicated in claims 1 or the function of the whole or part of the respective means executed by computer.

7. The data recorder as defined in claims 1, wherein the data input in said memory is a data input from a video recording & reproduction device through I/0 adaptor.

8. The data recorder as defined in claim 7, wherein said video recording & reproduction device outputs data of a size 4 times larger than the data size required for the indication of a single frame time on the display unit in said single frame time.

9. The data recorder as defined in claim 7, wherein said I/O adaptor is provided with a function of converting said data form adapted to VTR to a data form suitable for the data bus.

10. A data recorder equipped with recording unit composed of a host adaptor connected to a host bus and recording medium connected to the host adaptor, comprising:

a group of recording units composed of a plural number of sets of said recording unit, a readout means for reading out the data, split and recorded in the respective recording media in such a way that a plural number of recording media constituting said group of recording units become a single logical recording space, as a series of data, and an output means for outputting said readout data in that same order, wherein said readouts means temporarily records the readout data in the memory sequentially and then the data is output by an output means.

11. A method of access to a data recorder equipped with a recording unit composed of a host adaptor connected to a host bus and recording medium connected to the host adaptor and constituting a group of recording units with a plural number of sets of said recording unit, characterized in that the data to be recorded is split into prescribed size units and said split data are assigned to and recorded on a plural number of recording media so that the respective recording media may become a single logical recording space, wherein said split data are temporarily held in a memory in correspondence to the respective recording units, and then recording commands to said respective recording media of data are issued based on the state of saving in the memory, and said split data are recorded in a continuous space on said memory, and addresses of the continuous space in which are recorded said split data are assigned in another space on that memory corresponding to the respective recording units, in correspondence to said respective data recorders.

12. The method of access to data recorder as defined in claim 11, wherein, upon completion of the data transfer in prescribed size to the recording media, said recording commands are issued one by one at the point in time when the next data in prescribed size is held on the memory.

13. The method of access to data recorder as defined in claim 11, wherein, at the point in time when the data transfer in prescribed size is held on the memory, said recording commands are issued in the same number as an optionally decided number M or the number of units m of the data held on the memory in the range of m<M.

14. The method of access to data recorder as defined in claim 11, wherein, in said stage of proportioning of input, the split data corresponding to the respective recording media are recorded in the corresponding respective recording media at the time when the number of split data stored in said continuous space on the memory became "n" ("n" is a natural number).

15. The method of access to data recorder as defined in claim 11, wherein the prescribed size of said data is a fixed size used as unit of transmission.

16. The method of access to data recorder equipped with a recording unit composed of a host adaptor connected to a host bus and recording medium connected to the host adaptor and constituting a group of recording units with a plural number of sets of said recording unit, characterized in that the data, split and recorded in the respective recording media in such a way that said plural number of recording media may become a single logical recording space, are read out as a series of data, and the readout data are output in that same order, wherein said readout data is temporarily recorded in the memory, and then output.

17. A data transmitter, comprising an I/O adaptor for inputting and outputting specific data, requested for transfer, between a recording & reproduction device and a data bus, $1^{st}$ asynchronous transfer means for asynchronously transferring the specific data output from said I/O adaptor to said data bus to temporarily store it in a $1^{st}$ memory means, and $2^{nd}$ asynchronous transfer means for asynchronously transferring, immediately after accumulation of data in prescribed size in said $1^{st}$ memory means, the data in certain size among said data in prescribed size to a $2^{nd}$ memory at specific timing, wherein said data in prescribed size accumulated in said $1^{st}$ memory means is small at the start of said data transmission but becomes larger than an initial value with passage of time after the time of starting of a transmission.

18. The data transmitter, as defined in claim 17, wherein either one or both of said 1st asynchronous transfer or said 2nd asynchronous transfer are DMA transfer by bus master.

19. The data transmitter, as defined in claim 17, wherein said 2nd memory means is a storing means controlled by SCSI system, fiber channel system or IEEE system.

20. The data transmitter, as defined in claims 17, wherein said recording & reproduction device is a recording & reproduction device capable of recording & reproducing DVC signals at a speed 4 times faster than the normal speed.

21. The data transmitter, as defined in either of claim 17, wherein said I/O adaptor is an interface which converts data transmitted through network into a data in PCI bus form or vice versa.

22. The data transmitter, as defined in either of claim 17, wherein said 1st memory means is the main storing means of the computer.

23. The data transmitter as defined in claim 17, wherein said 1st asynchronous transfer means checks at the time of said data transmission, the data size available for transfer per unit period and, in case the data size of said prescribed data exceeeds said data available for transfer, splits said prescribed data into data blocks of a size not exceeding said data size available for transfer, and enables said transmission with those split data blocks as units.

24. A data transmitter, comprising an I/O adaptor for inputting and outputting specific data, requested for transfer, between a recording & reproduction device and a data bus, $1^{st}$ asynchronous transfer means for asynchronous transferring the specific data output from said I/O adaptor to said data bus to temporarily store it in a $1^{st}$ memory means, and $2^{nd}$ asynchronous transfer means for asynchronous transferring, immediately after accumulation of data in prescribed size in said $1^{st}$ memory means, data in certain size among said data in prescribed size to a $2^{nd}$ memory at a specific timing, wherein the data temporarily stored in said $1^{st}$ memory means is output and stored from said $1^{st}$ memory means to the recording & reproduction device by said $1^{st}$ asynchronous transfer means.

25. A data transmitter, comprising an I/O adaptor for inputting and outputting specific data, requested for transfer, between a recording & reproduction device and a data bus, $1^{st}$ asynchronous transfer means for asynchronous transferring the specific data output from said I/O adaptor to said data bus to temporarily store it in a $1^{st}$ memory means, and $2^{nd}$ asynchronous transfer means for asynchronous transferring, immediately after accumulation of data in prescribed size in said $1^{st}$ memory means, data in certain size among said data in prescribed size to a $2^{nd}$ memory at a specific timing, wherein said I/O adaptor is an interface which converts data in DVC form into data in host bus form or vice versa.

* * * * *